July 7, 1942. W. B. EDDISON ET AL 2,288,690
MACHINE AND METHOD FOR PUTTING WHEELS IN BALANCE
Original Filed Dec. 30, 1937 19 Sheets-Sheet 1
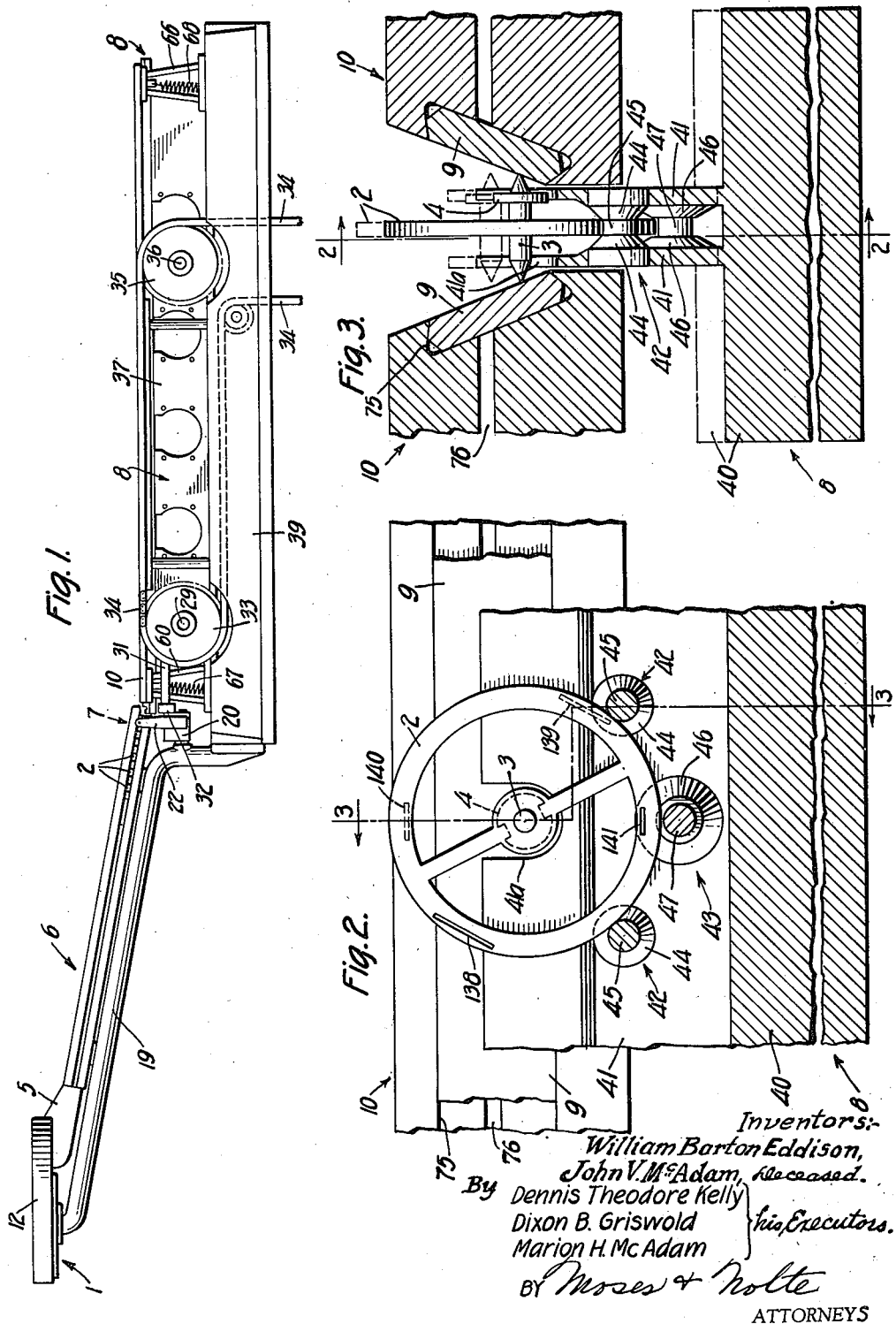
Inventors:-
William Barton Eddison,
John V. McAdam, deceased.
By Dennis Theodore Kelly
Dixon B. Griswold        his Executors.
Marion H. McAdam
By Moses & Nolte
ATTORNEYS

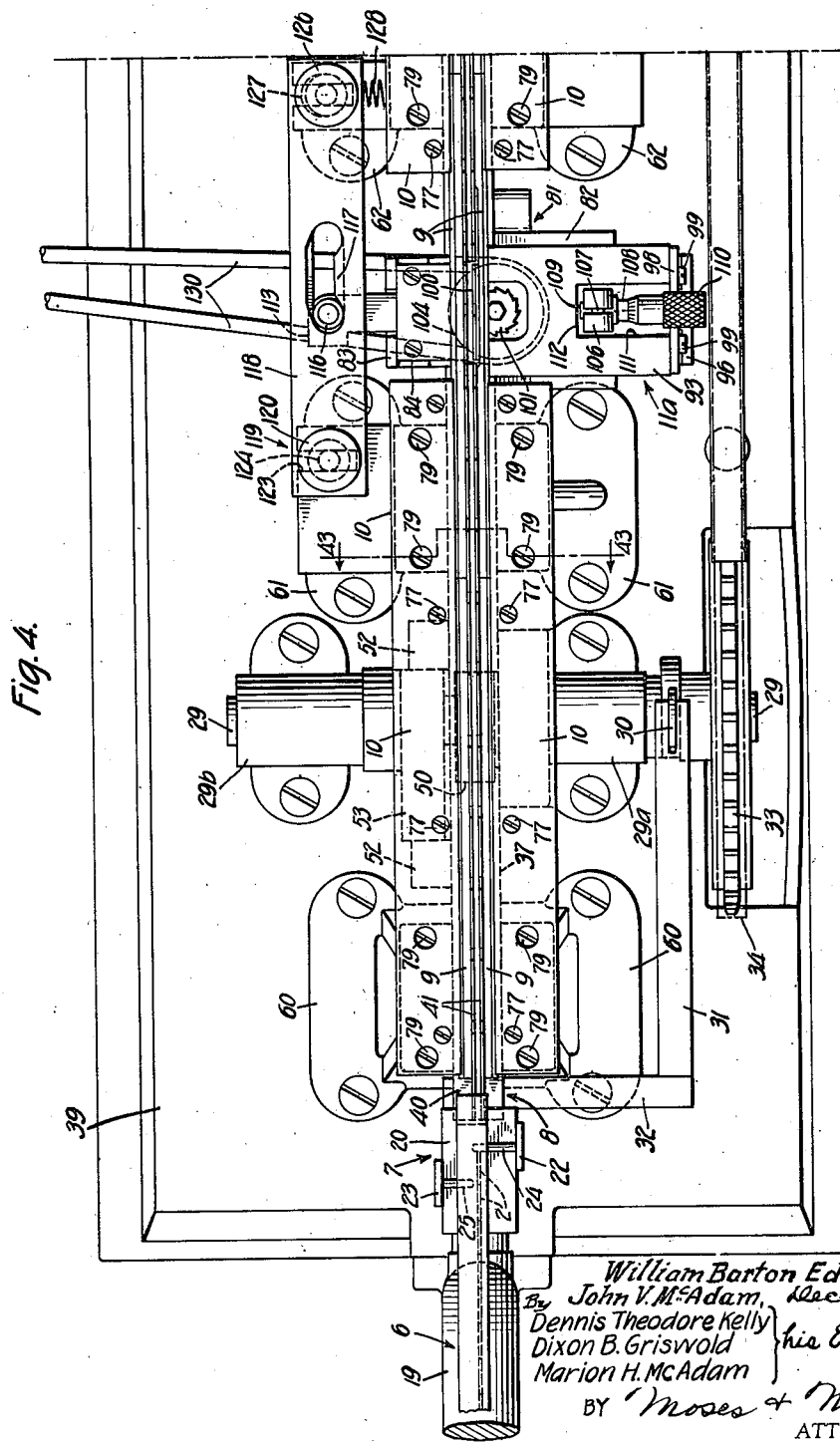

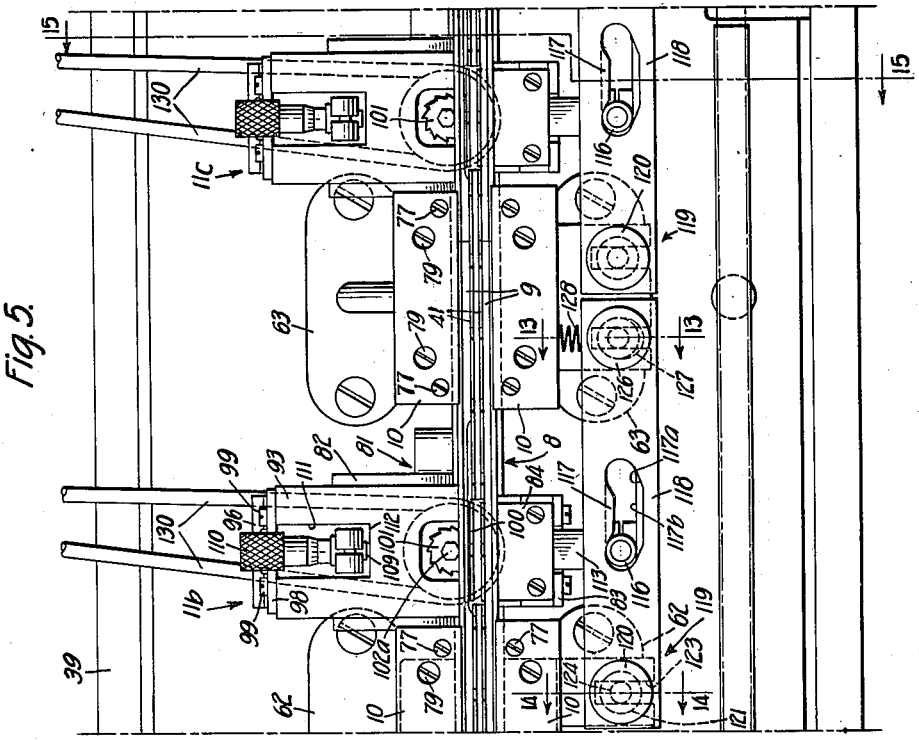

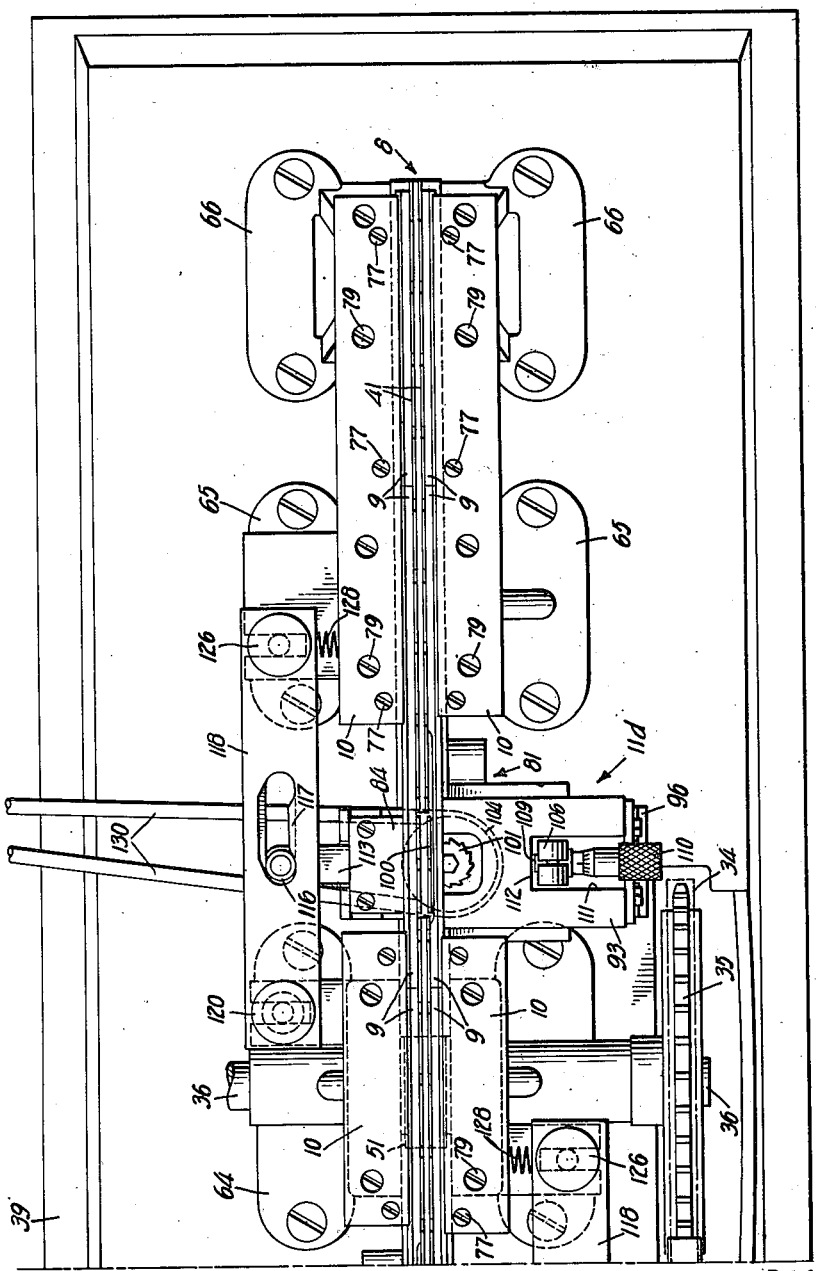

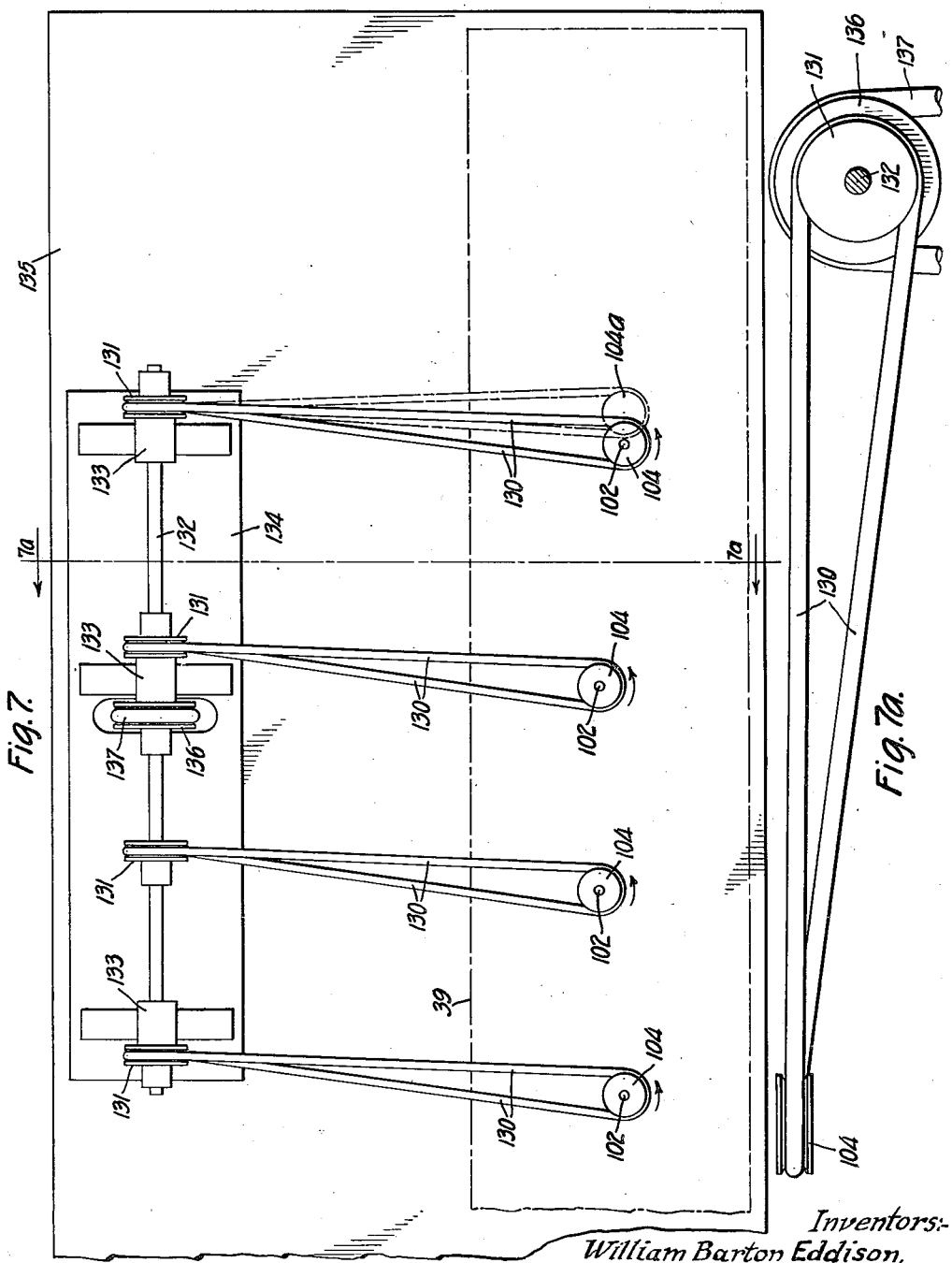

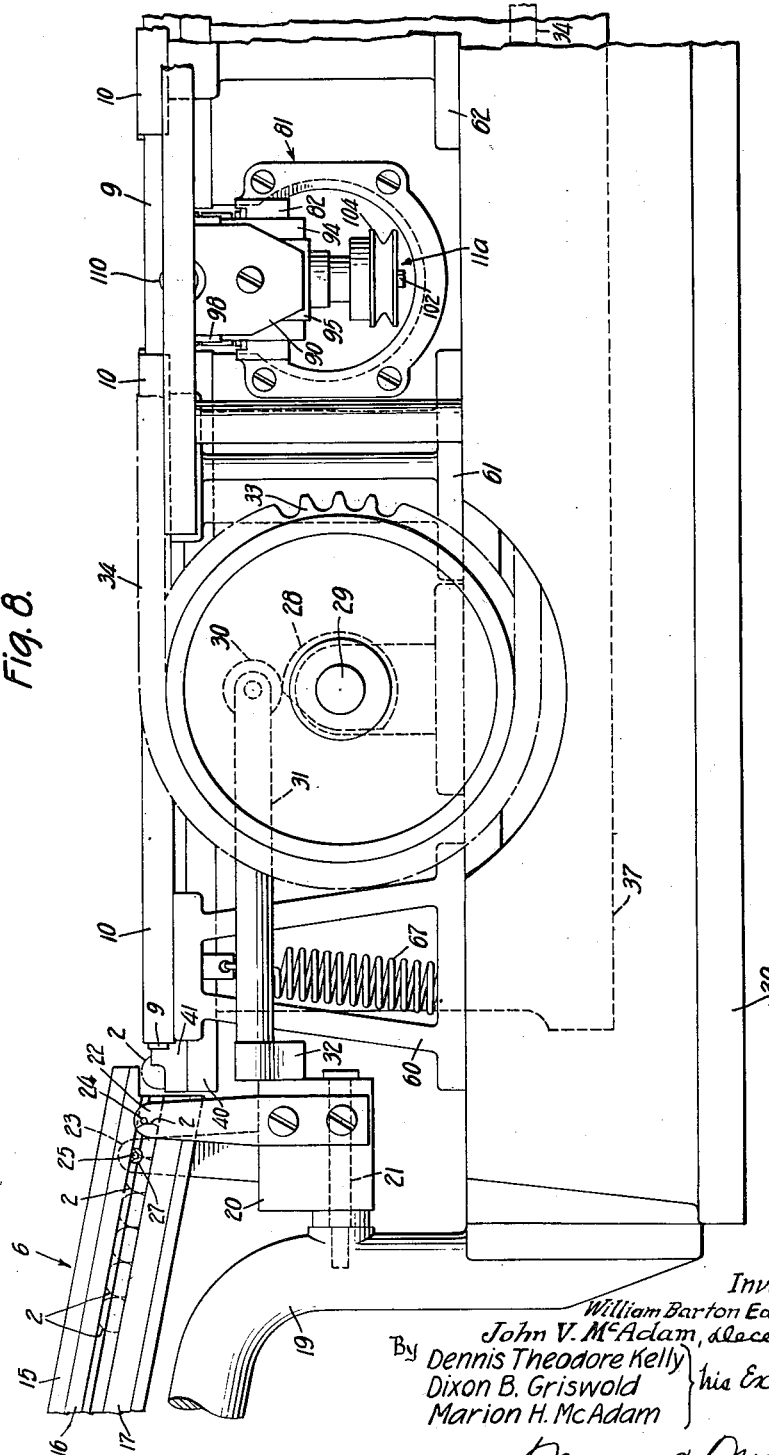

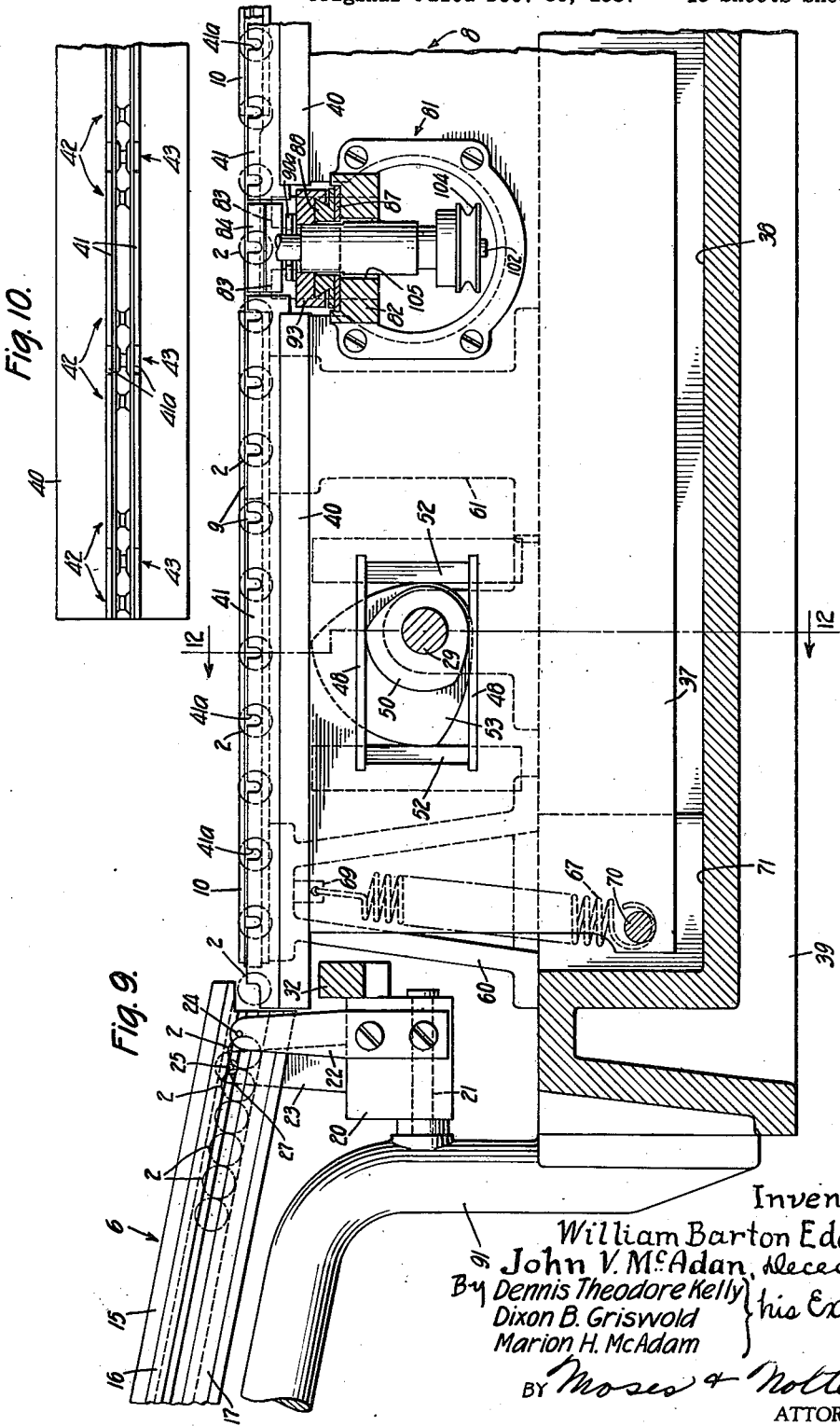

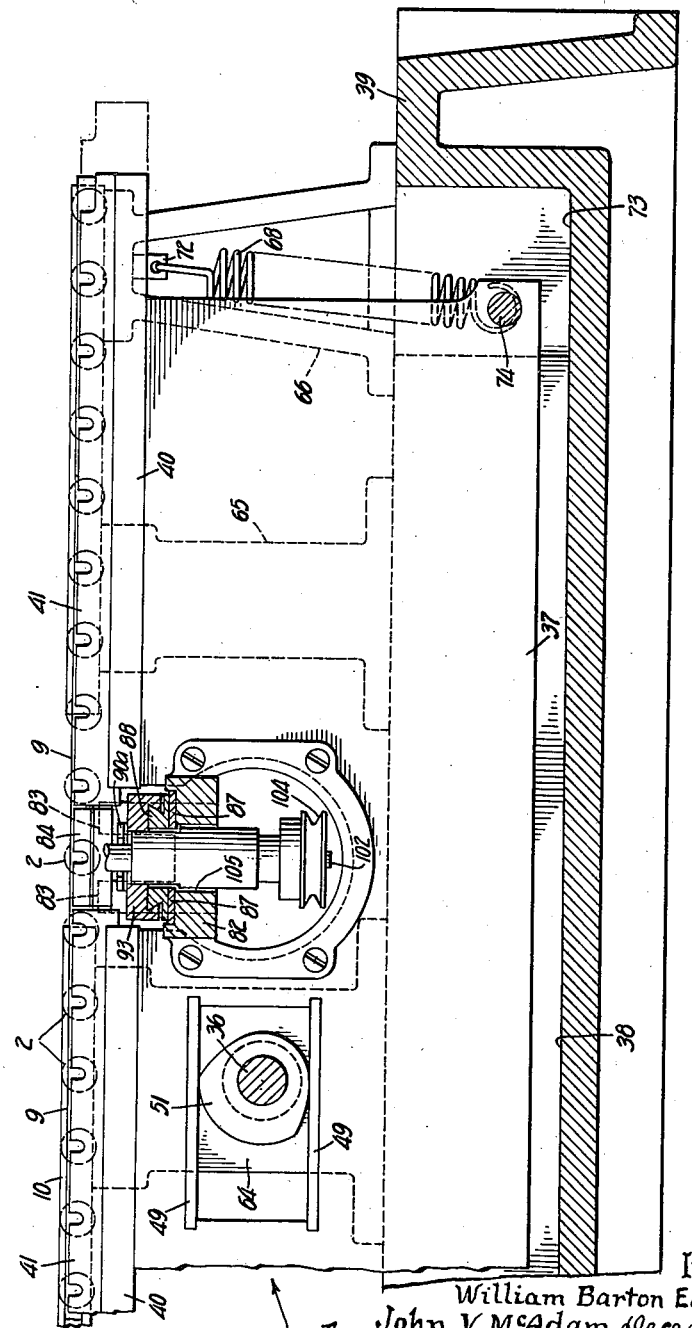

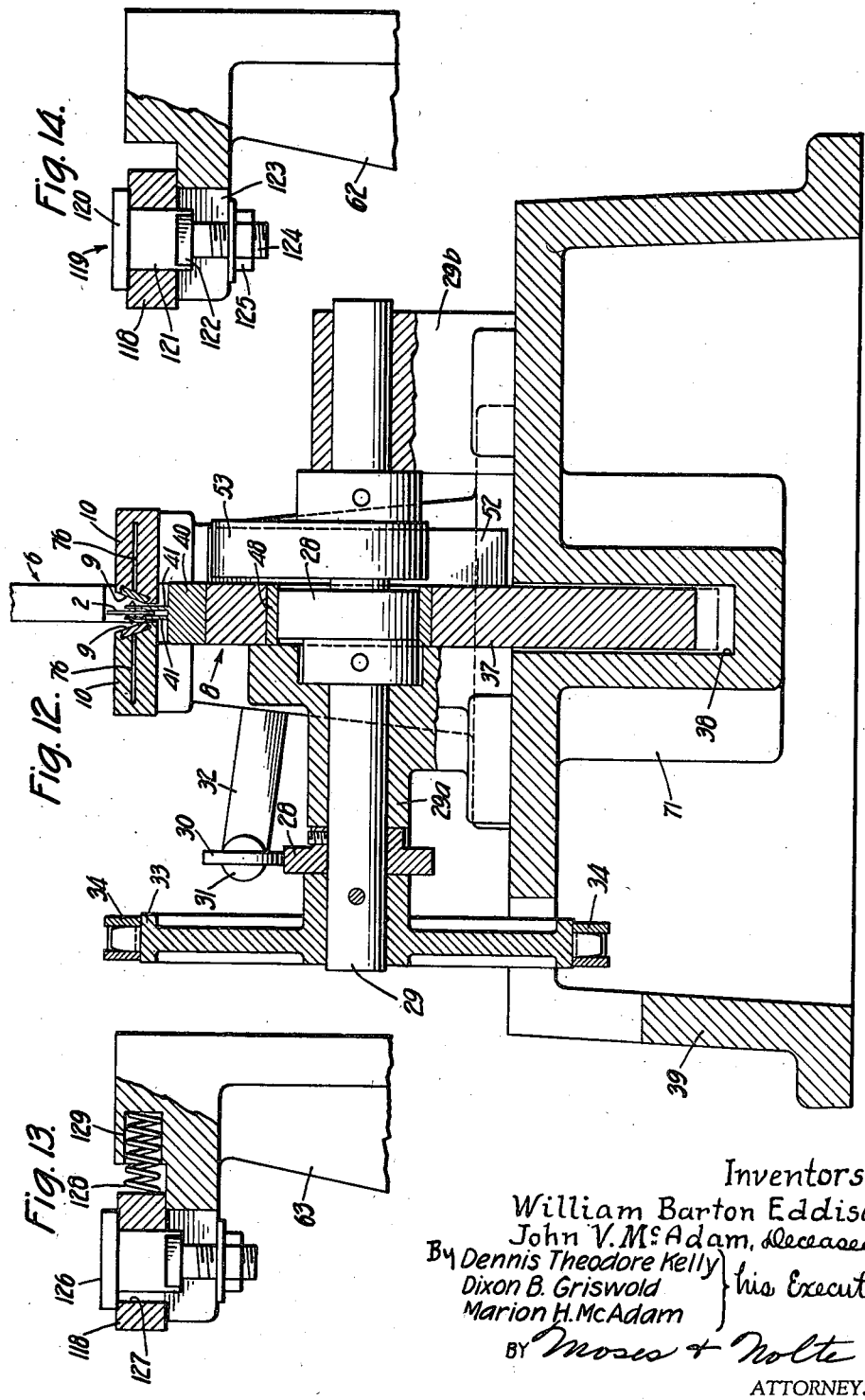

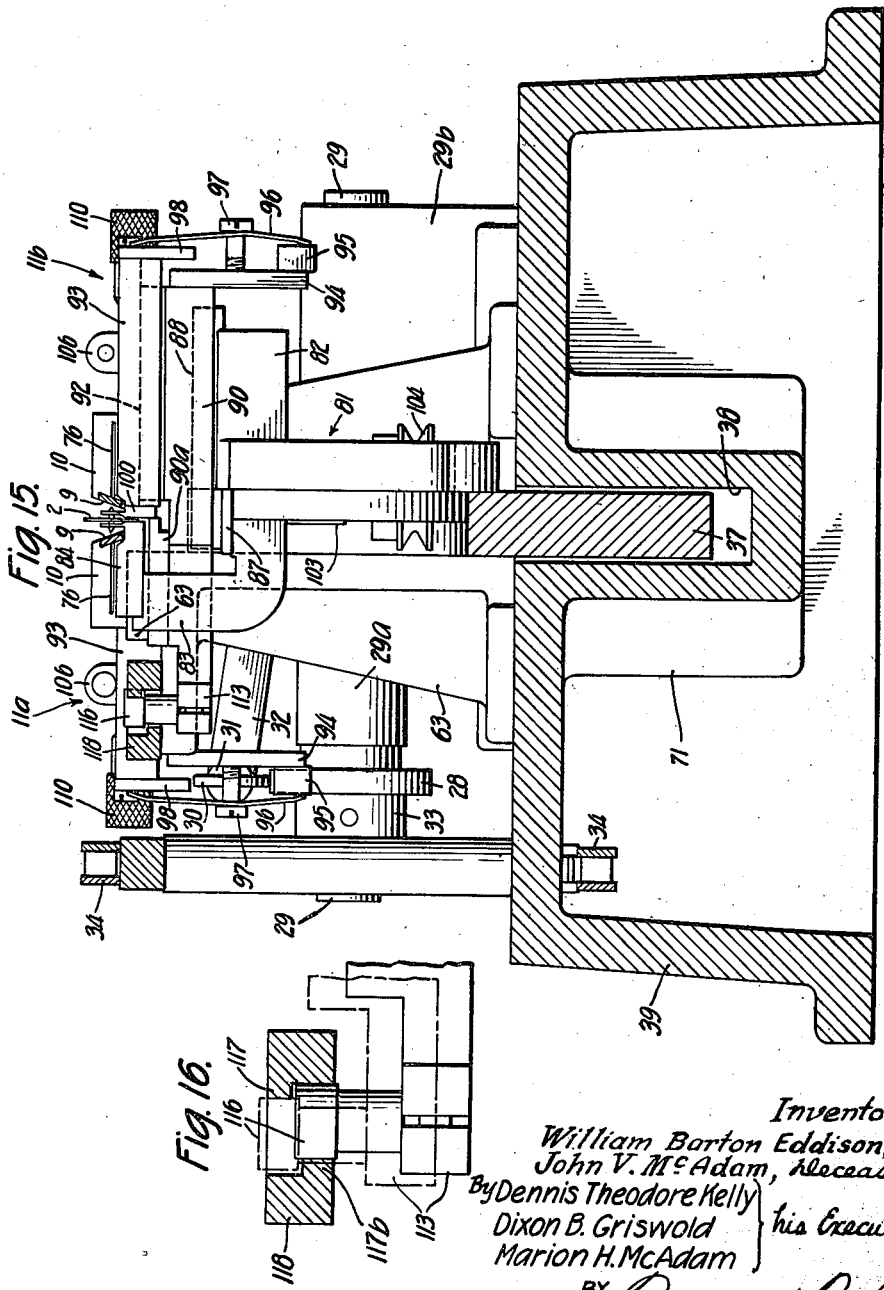

July 7, 1942.  W. B. EDDISON ET AL  2,288,690
MACHINE AND METHOD FOR PUTTING WHEELS IN BALANCE
Original Filed Dec. 30, 1937   19 Sheets-Sheet 11
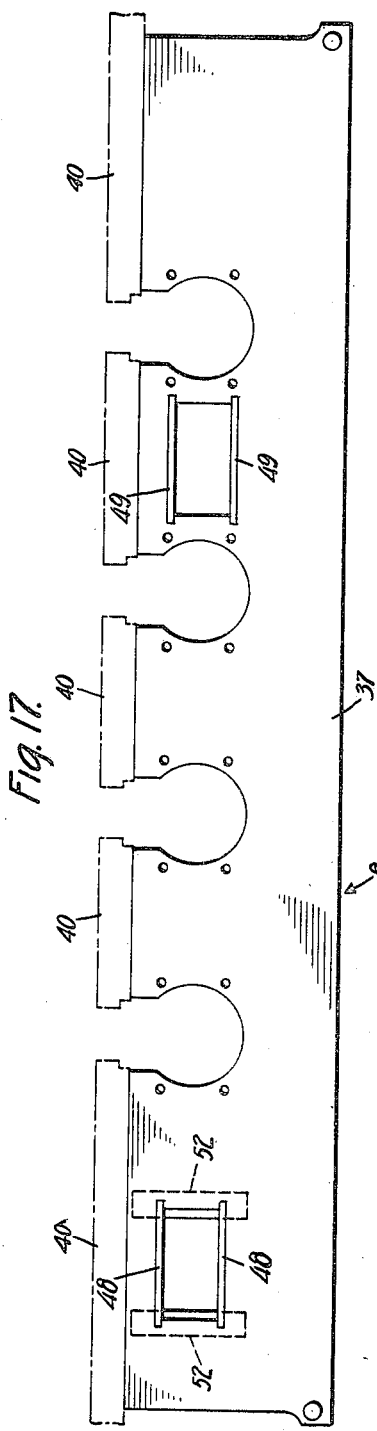
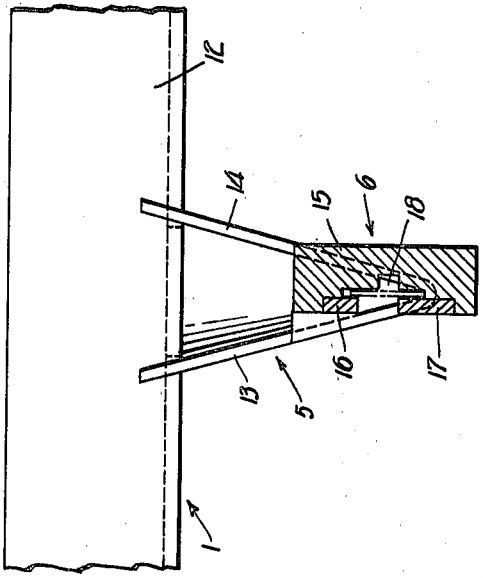
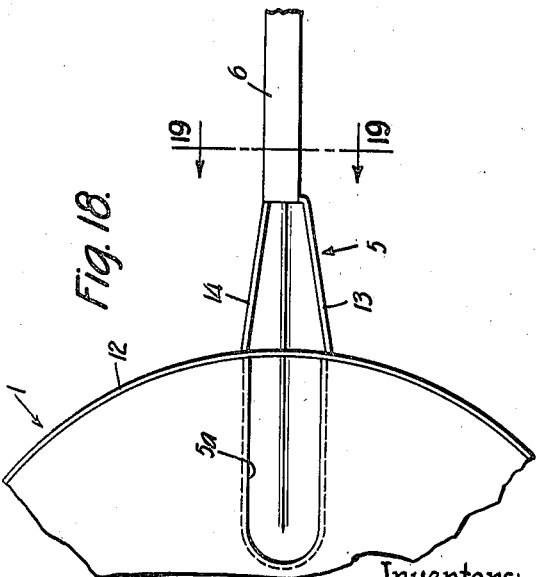
Inventors:-
William Barton Eddison.
John V. McAdam, Deceased.
By Dennis Theodore Kelly
Dixon B. Griswold } his Executors
Marion H. McAdam
BY Moses & Nolte
ATTORNEYS

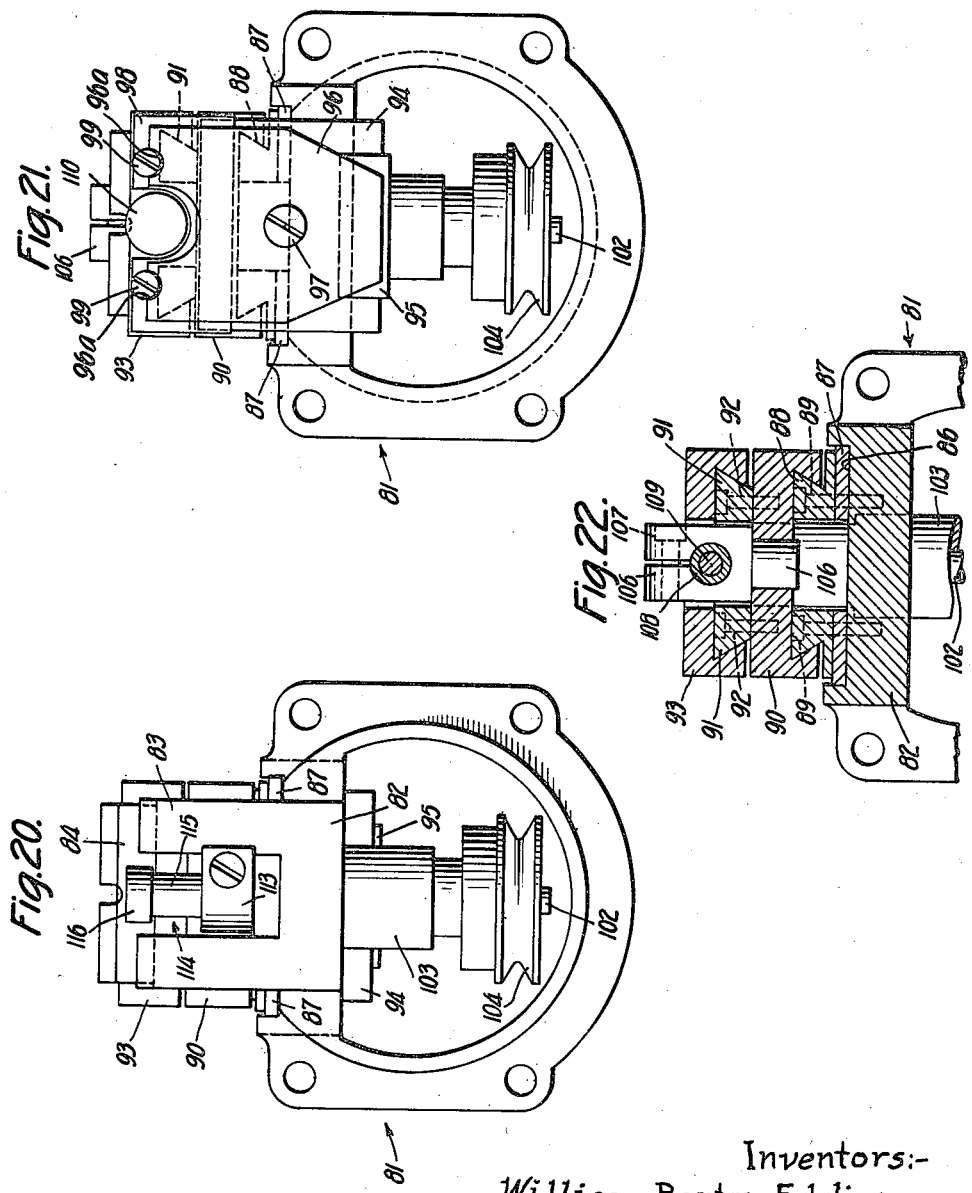

July 7, 1942. W. B. EDDISON ET AL 2,288,690
MACHINE AND METHOD FOR PUTTING WHEELS IN BALANCE
Original Filed Dec. 30, 1937 19 Sheets-Sheet 13
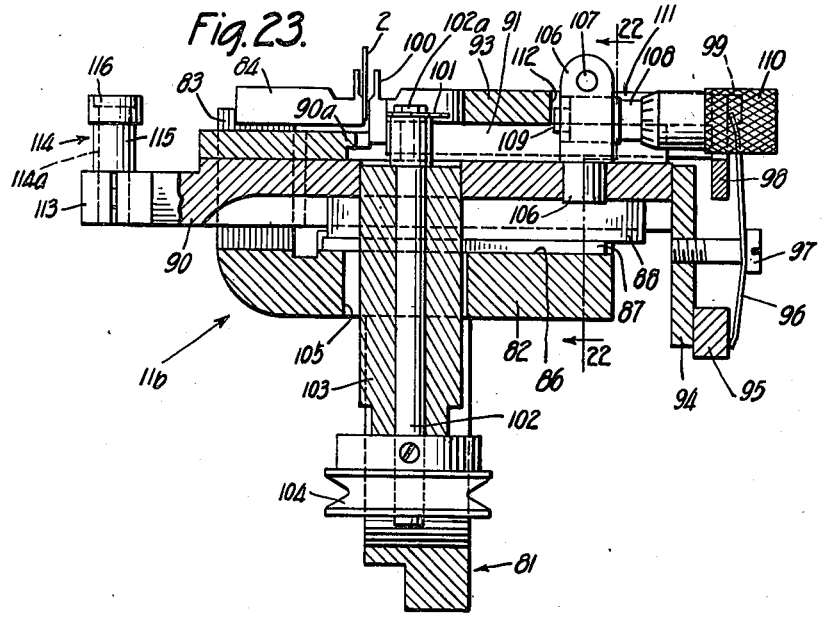
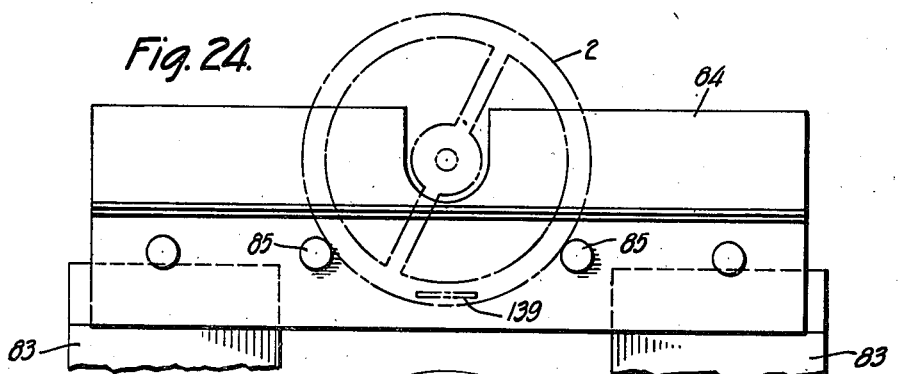
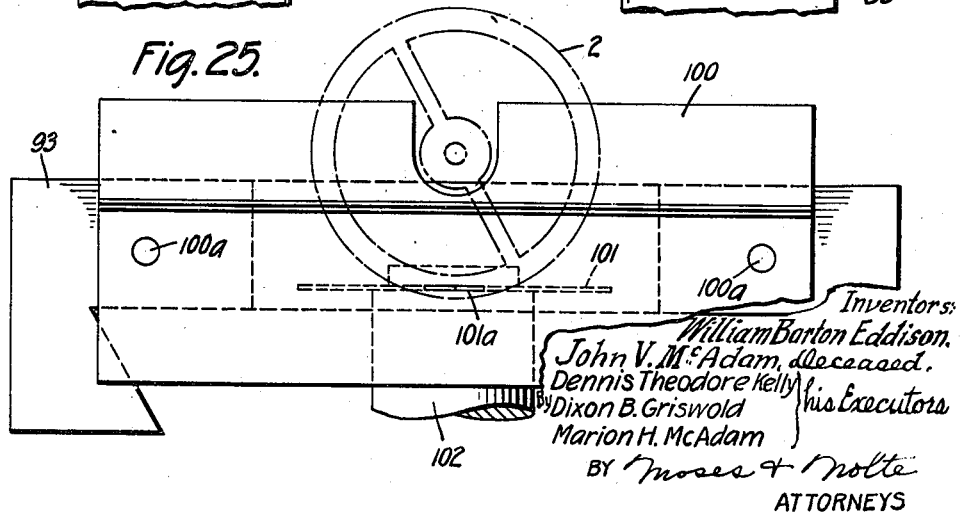

July 7, 1942.　　W. B. EDDISON ET AL　　2,288,690
MACHINE AND METHOD FOR PUTTING WHEELS IN BALANCE
Original Filed Dec. 30, 1937　　19 Sheets-Sheet 14

Inventors:-
William Barton Eddison.
John V. McAdam, deceased.
By Dennis Theodore Kelly
Dixon B. Griswold      his Executors
Marion H. McAdam
By Moses & Nolte
ATTORNEYS

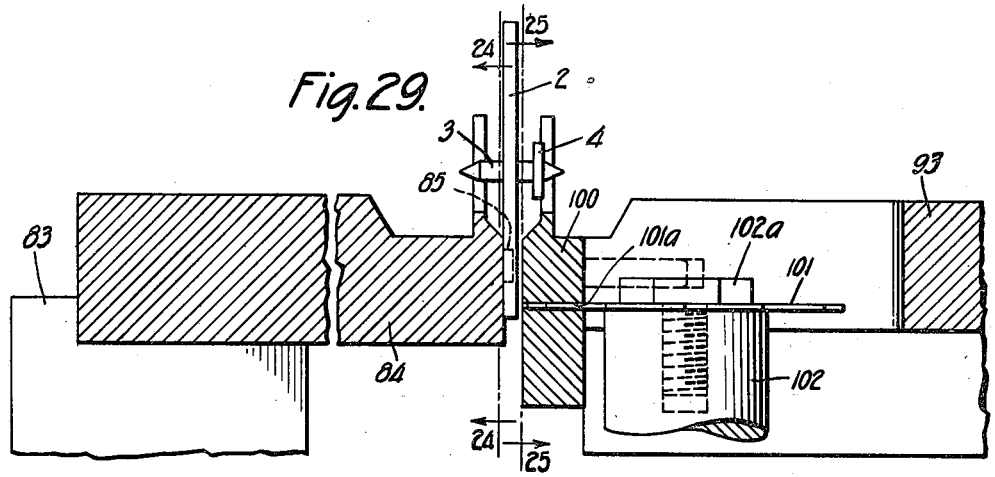
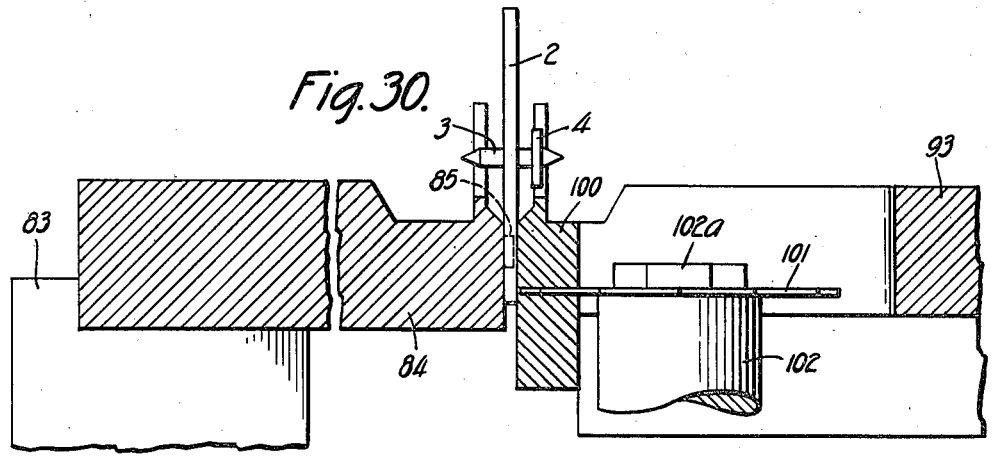
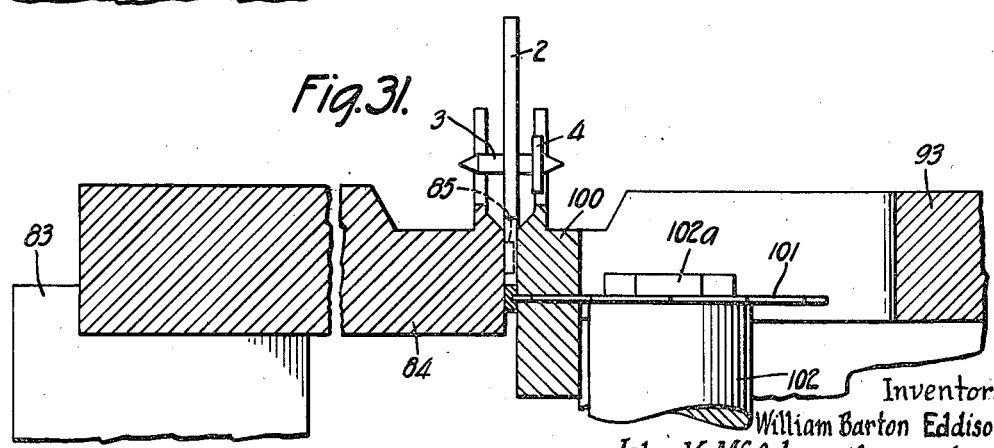

July 7, 1942.   W. B. EDDISON ET AL   2,288,690
MACHINE AND METHOD FOR PUTTING WHEELS IN BALANCE
Original Filed Dec. 30, 1937   19 Sheets-Sheet 16

Inventors:
William Barton Eddison,
John V. McAdam, Deceased.
By Dennis Theodore Kelly
Dixon B. Griswold    his Executors.
Marion H. McAdam
BY Moses & Nolte
ATTORNEYS

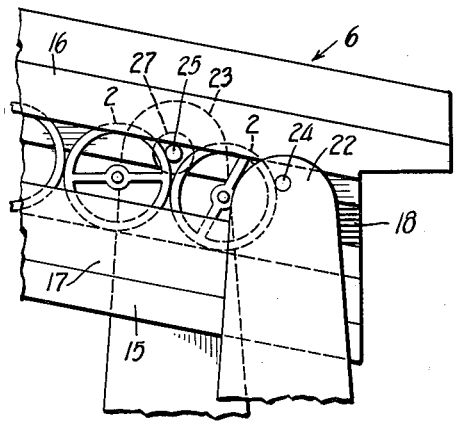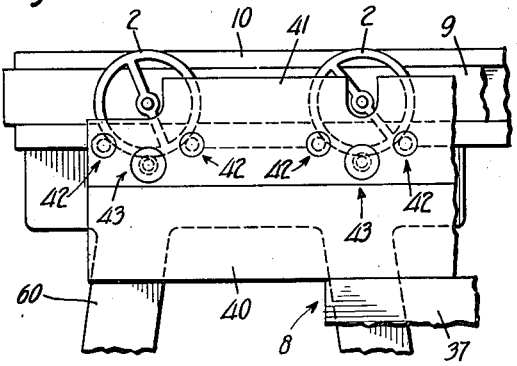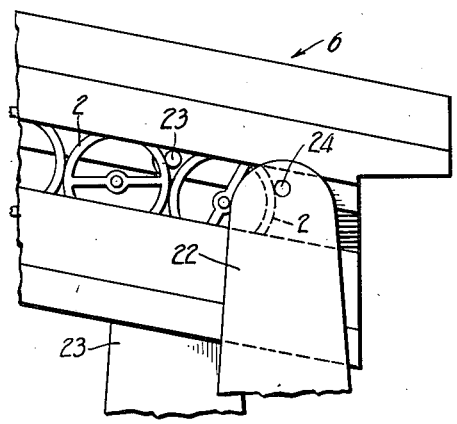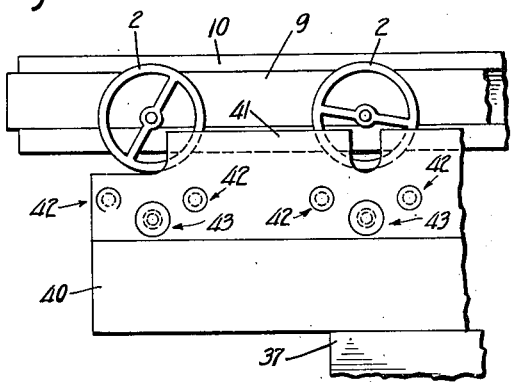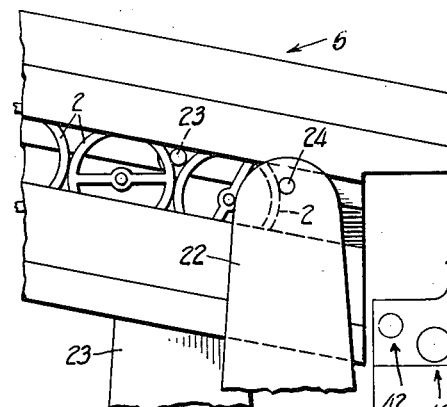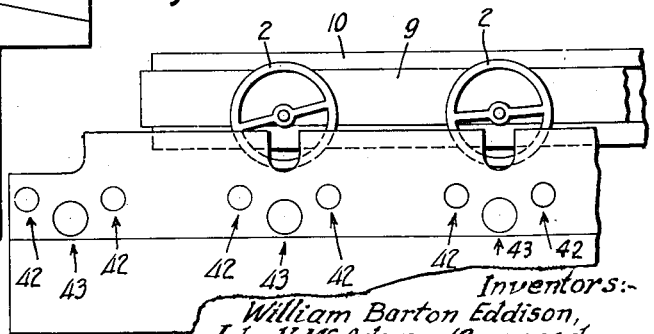

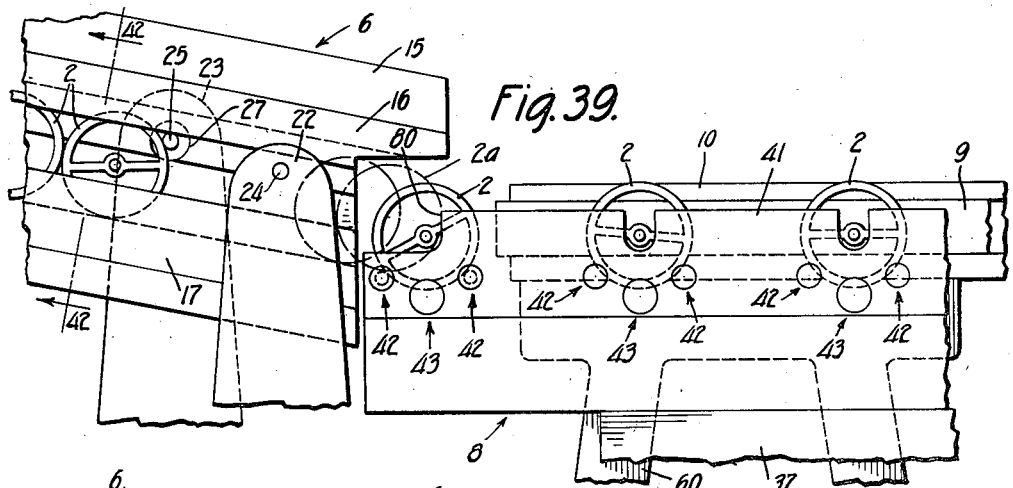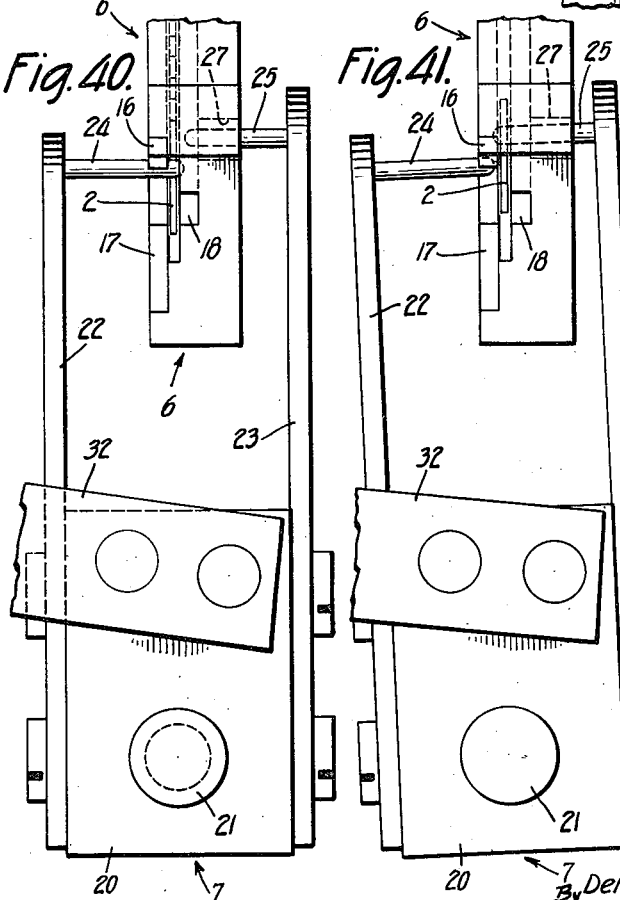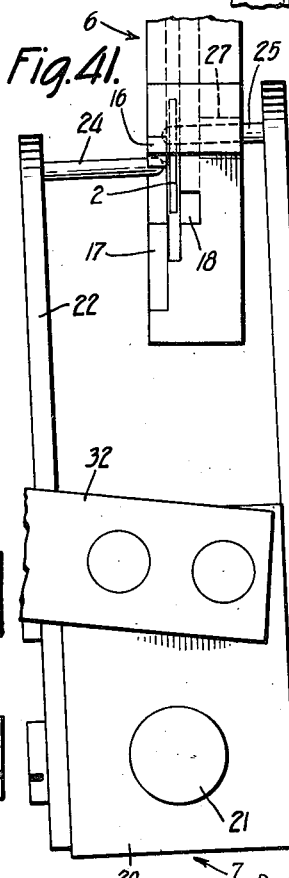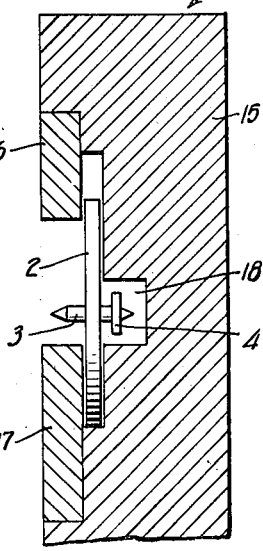

July 7, 1942. W. B. EDDISON ET AL 2,288,690
MACHINE AND METHOD FOR PUTTING WHEELS IN BALANCE
Original Filed Dec. 30, 1937 19 Sheets-Sheet 19

Inventors:-
William Barton Eddison,
John V. McAdam, deceased.
By Dennis Theodore Kelly
Dixon B. Griswold } his Executors.
Marion H. McAdam BY Moses & Nolte
ATTORNEYS Patented July 7, 1942

2,288,690

UNITED STATES PATENT OFFICE 2,288,690

MACHINE AND METHOD FOR PUTTING WHEELS IN BALANCE

William Barton Eddison, Ardsley on Hudson, N. Y., and John V. McAdam, deceased, late of Ardsley on Hudson, N. Y., by Dennis Theodore Kelly, Dixon B. Griswold, and Marion H. McAdam, executors, Hastings on Hudson, N. Y.; said executors assignors to said Eddison Application December 30, 1937, Serial No. 182,634
Renewed November 17, 1939

47 Claims. (Cl. 90—11)

This invention relates to machines and methods for the balancing of work pieces about an intended axis of rotation or oscillation thereof, and particularly for the balance wheels of time pieces, such as clocks.

A purpose of the invention is to provide a machine for balancing of work pieces in such manner that it is not necessary to measure or determine the amount of initial unbalance of the work pieces.

A further purpose is to provide a machine for balancing which will effect the result with a minimum of skill and attention on the part of the operator.

A further purpose is to provide a machine for balancing which effects the result substantially automatically or semi-automatically whereby, for example, to effect balance correction of work pieces one after another as long as the parts are supplied to the receiving end of the machine.

A further purpose is to provide improved balancing methods, particularly in a manner adapted for effecting one or more of the purposes previously mentioned.

Further purposes are generally to simplify and improve the method of balancing and to simplify and improve the construction and operation of machines for balancing, and still other purposes will be apparent in the light of this disclosure.

The machine herein illustrated and described is for balancing a clock balance wheel and, for convenience, many of the terms used in the description of the work pieces and machine, and of the balancing methods used in the machine are specifically or particularly applicable to clock wheels and their manufacture. It is to be understood, however, that where the invention of the structures or methods disclosed is applicable to the balancing of other work pieces and terms used are to be given correspondingly broad significance, both in the disclosure and in the claims.

The term "balancing" as used in this specification covers the idea of bringing the wheel into static balance, this often being referred to in the clock industry as the process of "poising." In this specification, however, for clarity the word "poising" is used only to cover the idea of permitting the wheel to rotate about its axis to permit its center of gravity to seek or assume a static condition in which the center of gravity is directly beneath the axis of rotation. It will be understood, however, that the invention is not limited to poising as just defined, since it may be practiced, in some of its aspects, by use of other well known methods for determining the angular position of the unbalance in a work piece as, for example, by dynamically determining the position while the work piece is rotating.

In the original making of a balance wheel, even for cheap time pieces, such as alarm clocks, the wheel forming mechanism can be depended upon, if reasonable care is exercised, to produce wheels which are in balance within reasonably close limits. It is a purpose of the present invention to provide a method and means for economically and dependably reducing the amount of possible final error to within a known, small fraction of the determined limit of error of original manufacture.

To this end in the machine here shown each wheel is subjected to repeated poising and repeated milling or cutting operations, the material cut away being taken from a marginal portion of the heavy side of the wheel and being desirably equal in amount to one half of the original limit of error. After this first cutting operation, the wheel cannot be out of true by an amount greater than one half of the original limit of error. The wheel is then again poised and similarly cut to remove one half as much material as was removed at the original cutting operation. This second cutting operation brings the error to within one quarter of the original limit of error. The operation may be repeated as many times as desired, each cutting operation being effective to cut in half the assured limit of error.

In the illustrative embodiment four cuts are made. Since the marginal area available for cutting is limited, and since more than one cut may occur in the same sector of the wheel, the possibility of overlapping the cuts is avoided by utilizing two distinct annular cutting zones at each side of the wheel.

In the illustrative embodiment, where four cuts are made, the wheel may be regarded as originally out of balance by any amount from zero to sixteen units. The first cut takes away eight units from the heavy side so that the wheel becomes out of balance not more than eight units. The second cut takes away four units from whatever side is now the heavy side so that the wheel is out of balance not more than four units. The third cut similarly takes away two units so that the wheel is not out of balance more than two units, and the fourth cut takes away one unit so that the wheel is not out of balance more than one unit. The result of this principle of cutting is that any wheel which enters the cutting process out of balance by exactly an odd number of units will come out perfect, while any wheel which goes into the cutting or milling process perfect or out of balance any even number of units up to sixteen will come out one unit out of balance, one unit being the permissible limit of error in the output of the process.

A fifth cutting step would again cut the limit of error in half and the same thing would be true for each step of cutting added, the rule being always that each step removes just one half as much material as the next preceding step. While the statement that one half as much material is removed at each step as at the preceding step is roughly true, it is to be understood, of course, that the material cut away from an inner zone should be slightly greater than this proportion, so that in fact the moment of the material removed at a cutting operation is always one half of the moment of the material removed at the preceding cutting operation.

In the illustrative apparatus, the receiving mouth serves to align the wheels and deliver them sequentially into a magazine. Escapement mechanism causes the wheels to be discharged from the magazine, one by one, in timed relation, onto a carriage for advancing the wheels step by step to successive cutting stations.

The carriage is desirably constructed to have a four motion movement for cooperating with poising bars and with wheel clamping and cutting instrumentalities. A plurality of wheels is acted upon by the carriage simultaneously. The first wheel delivered onto the carriage at the receiving end is carried forward one step, the carriage then moves downward leaving the wheel supported on a pair of poising bars where it may turn without moving bodily to cause the center of mass of the wheel to assume a position directly below the point of support. While this poising is going on, the carriage moves backward and then upward into position to receive a second balance wheel. The next upward movement lifts the first wheel off of the poising bars, and as the carriage again moves forward, the first wheel is carried forward a second step. The balance wheels are thus advanced step by step and poised repeatedly. During certain of the advancing steps the cutting is performed.

When a wheel is being advanced at a cutting station a clamp, mounted on the carriage, is automatically operated and the cutter is caused to move inward to make a cut of precisely determined magnitude. At the end of such a forward step, the clamp and the cutter retreat, leaving the wheel free to be again deposited upon the poising bars as the carriage moves downward. The wheel leaving the first cutting station is again repeatedly advanced and poised and then delivered to the second cutting station. This treatment is repeated until the wheel has passed the last cutting station, whereupon it is discharged from the machine.

It will be understood that, while the milling or cutting operation previously or subsequently referred to for the unbalance correction of the illustrative machine of the drawings is particularly suited to the correction of unbalance for clock wheels, it may be desirable for other types of work pieces to use other well-known unbalance correction expedients.

Fig. 1 is a longitudinal elevation of a clock wheel balancing machine incorporating the invention, some of the parts being omitted;

Fig. 2 is a fragmentary, sectional elevation on a larger scale than Fig. 1, the section being taken on the line 2—2 of Fig. 3 looking in the direction of the arrows;

Fig. 3 is a fragmentary, transverse, vertical, sectional view, partly broken away, the section being taken on the line 3—3 of Fig. 2 looking in the direction of the arrows;

Figs. 4, 5 and 6 are successive plan views which, when laid end to end, illustrate the entire cutting mechanism and a fragment of the supply mechanism for supplying the wheels to the cutting mechanism of Figs. 4, 5 and 6;

Fig. 7 is a plan view illustrating particularly a portion of the means for driving the milling cutters;

Fig. 7a is a sectional view taken on the line 7a—7a of Fig. 7 looking in the direction of the arrows;

Fig. 8 is a fragmentary view in longitudinal elevation illustrating the delivery end of the supply mechanism and the carriage and cutting mechanism to a point slightly beyond the first cutting unit;

Fig. 9 is a fragmentary, longitudinal, vertical, sectional view relating to substantially the same portion of the machine as Fig. 8;

Fig. 10 is a fragmentary, plan view, illustrating a portion of the carriage;

Fig. 11 is a view similar to Fig. 9 but illustrating the other end of the machine;

Fig. 12 is a transverse, vertical, sectional view taken on the line 12—12 of Fig. 9 looking in the direction of the arrows;

Fig. 13 is a fragmentary, vertical, sectional view taken on the line 13—13 of Fig. 5, looking in the direction of the arrows;

Fig. 14 is a fragmentary, vertical, sectional view taken on the line 14—14 of Fig. 5 looking in the direction of the arrows;

Fig. 15 is a transverse, vertical, sectional view taken on the line 15—15 of Fig. 5 looking in the direction of the arrows;

Fig. 16 is a fragmentary, vertical, sectional detail view, of a portion of Fig. 15, showing a clamp operating cam and slide in full and dotted line positions;

Fig. 17 is a view in longitudinal elevation of the carriage;

Fig. 18 is a fragmentary plan view of a supply tray showing particularly a receiving mouth into which the wheels are pushed singly by an attendant;

Fig. 19 is a fragmentary view in sectional elevation, the section being taken on the line 19—19 of Fig. 18 looking in the direction of the arrows;

Fig. 20 is a view in elevation of one of the cutting units;

Fig. 21 is a view of the same cutting unit as seen from the opposite side;

Fig. 22 is a fragmentary, vertical, sectional view of the cutting unit of Figs. 20 and 21, the section being taken on the line 22—22 of Fig. 23, looking in the direction of the arrows;

Fig. 23 is a transverse, vertical sectional view of the cutting unit of Figs. 20 to 22;

Fig. 24 is a fragmentary view illustrating a wheel clamping member for holding a wheel in cutting position, the illustrated parts being viewed from the plane of the line 24—24 of Fig. 29, looking in the direction of the arrows;

Fig. 25 is a similar view of a complementary clamping member and associated parts, the parts being viewed from the plane of the line 25—25 of Fig. 29, looking in the direction of the arrows;

Fig. 29 is a fragmentary view in transverse vertical section showing a balance whel about to be clamped;

Fig. 30 is a view similar to view 29 showing the balance wheel clamped for cutting;

Fig. 31 is a view similar to Figs. 29 and 30 showing the cutting operation in progress;

Fig. 36 is a fragmentary view showing the delivery end of the supply mechanism and the introductory end of the carriage mechanism at the end of an advancing step of the carriage;

Fig. 37 is a view similar to Fig. 36 but illustrating the parts at the end of a descending step of the carriage;

Fig. 38 is a view similar to Figs. 36 and 37 illustrating the parts at the end of a receding or return step of the carriage;

Fig. 39 is a view similar to Figs. 36 to 38 illustrating the parts at the end of an ascending step of the carriage;

Fig. 40 is a fragmentary detail view in elevation illustrating the escapement mechanism in position to restrain the leading balance wheel held by the supply magazine;

Fig. 41 is a view similar to Fig. 40 but showing the escapement mechanism in position to release the leading balance wheel but to temporarily restrain the following balance wheel;

Fig. 42 is a vertical, sectional view taken on the line 42—42 of Fig. 39, looking in the direction of the arrows;

Figure 26:
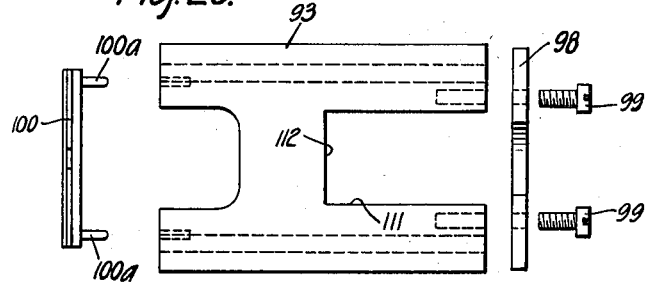
Fig. 26 is a disassembled view showing the parts of an upper or clamping slide of a cutting unit in relative positions ready for assembly.

Before proceeding with a detailed description of the parts, the major parts of the machine will be pointed out in their relation to one another so as to give an idea of the relation of the parts and the purpose of the component mechanisms.

At the introductory end of the machine a tray 1, Fig. 1, is provided, into which a number of balance wheels 2 are dumped from time to time. Each balance wheel includes a shaft or staff 3, Figs. 2 and 3, having conical ends which taper to a point. On each shaft there is also a disc 4. The operator simply pushes these wheels into a receiving trough 5, which is suitably shaped to right the wheels and conduct them by gravity into a magazine 6. Escapement mechanism 7 controls the delivery of the wheels one by one, in timed relation, to a four motion carriage 8. The upper portion of the carriage operates between inclined poising bars 9 which are mounted stationary in clamping bars 10. The poising bars extend continuously from a point near the delivery end of the magazine 6 to the delivery end of the machine, but they are made in sections, the sections of a bar being arranged in abutting relation and so mounted that each bar section is jointly supported by two successive clamping bars.

The carriage moves forward, downward, backward and upward in a substantially rectangular path. In its upward position it supports the wheels clear of the poising bars. The carriage carries four clamping and cutting units 11a, 11b, 11c and 11d, Figs. 4 to 6. During a forward movement of the carriage a wheel, which is at a cutting station, is automatically clamped, cut and unclamped. When the carriage then descends, the wheel is again left suspended on the poising bars. The wheel turns on the poising bars as the carriage moves backward and then upward. It is then carried forward another step by the next forward movement of the carriage.

A series of steps of the carriage is required to carry a wheel from one cutting station to the next. Thus, between successive cutting operations a wheel is repeatedly deposited on the poising bars 9 so as to be given an adequate opportunity to settle down with the heavier side of the wheel at the bottom before the next cutting operation is performed upon the wheel.

The tray 1 (see particularly Figs. 1, 18 and 19) is generally in the form of a flat circular dish having an upstanding circumferential flange 12 for confining the wheels dumped upon it. At one side of the dish an opening 5a is formed in a restricted area and the receiving trough 5 is secured in place to register beneath the opening. The receiving trough 6 is formed with sides 13 and 14 which slope sharply downward in convergent relation to form a V. The angle made by the V is substantially the same as that which would be formed between two lines drawn, respectively, from the opposite ends of a wheel shaft 3 to a common point on the periphery of the wheel. Hence the trough serves automatically to set each wheel in an upright position with its periphery resting in the base of the trough and with the ends of its shaft engaging the walls 13 and 14 at approximately a common level. The magazine 6 is mounted to communicate with the lower or delivery end of the trough 5 and is constructed and arranged to conduct the wheels 2 downward by gravity away from the trough 5 while maintaining them in their upright positions. The magazine consists of a recessed block 15, Figs. 19 and 42, having bars 16 and 17 secured in rabbets formed in the block and partially overlapping the block recess. A groove 18 is formed in the base of the block recess for passing the discs 4 and/or one end of each shaft. The block 15 and the bar 17 jointly embrace the lower side of a wheel and form a guide channel for it, and the block 15 and the bar 16 jointly embrace the upper side of the wheel and form a guide channel for the upper side. The tray 1, the trough 5, and the magazine 6 are all supported upon an arm 19, Fig. 1, which is secured to a stationary part of the machine frame.

An escapement mechanism 7 is provided at the delivery end of the magazine 6 for causing the wheels to be delivered, one by one, in definitely timed relation. The escapement mechanism 7 comprises a block 20 which is pivotally mounted upon a stud 21 carried by the arm 19. This mechanism is best illustrated in Figs. 4, 8, 9, 40 and 41. The block 20 has upstanding parallel arms 22 and 23 secured to it which are disposed at opposite sides of the magazine 6. The arm 22 carries a finger 24 which, in its restraining position, extends into the magazine and across the path of the foremost wheel as illustrated in Figs. 36 and 40. The arm 23 carries a finger 25 which extends into the magazine 6 through an opening 27, and which may be projected across the path of the second wheel in a position like that illustrated in Fig. 41. When the finger 24 stands across the wheel path it restrains the foremost wheel in the magazine and hence maintains the entire line of following wheels stationary. When the block 20 is rocked toward the left, the finger 25 moves toward the left far enough to enter between the first and second wheels in the magazine, so that the second wheel is restrained from following the first when the first is released. Continued rocking movement toward the left causes the pin 24 to move clear of the first wheel so that the first wheel is delivered by gravity to the carriage 8, as in Fig. 29. As the block 20 is rocked in the opposite direction or toward the right, as viewed in Figs. 40 and 41, the pin 24 is carried across the wheel path and the pin 25 is thereafter withdrawn from the wheel path so as to permit the row of wheels to descend until arrested by engagement of the leading wheel with the pin 24.

The rocking movements as described, are imparted to the escapement mechanism from a cam 28, Figs. 4, 8 and 12, fast on a shaft 29 supported by fixed brackets 29a and 29b. The cam 28 acts upon a follower roller 30 carried by a rod 31. The rod is fixed upon an arm 32 which arm in turn extends laterally across the machine to the block 20, see Fig. 40 also, and is affixed to the block. The unbalanced weight of the rod 31 and the arm 32 yieldingly urges the escapement mechanism toward the left.

The shaft 29 is driven by means of a sprocket 33 fast on the shaft 29, and a driving chain 34 which is trained on the sprocket. The chain 34, which drives the shaft 29, also acts through a sprocket 35, Figs. 1 and 6, to drive a shaft 36. The shafts 29 and 36 drive cams (as will presently be described) for imparting a four motion feed to the carriage 8 so that the operation of the escapement mechanism and the movements of the carriage may be precisely timed with relation to one another.

The carriage 8 comprises a vertical web or bar 37, Figs. 4, 5, 6, 9, 10, 12 and 17, whose lower end plays in a channel 38 formed in a stationary base member 39. The bar 37 does not engage the walls of the channel 38, but the clearance is desirably made fine enough to preclude the dropping of balance wheels into the channel.

The bar 37 has mounted upon it a plurality of bar sections, 40, (Fig. 17,) each having parallel upstanding webs 41, Figs. 3 and 10. At uniform intervals along the webs 41, wheel supporting pins 42 and 43 are provided in sets of three to extend between the webs. Each pin set comprises two pins 42 and one pin 43, the arrangement being such that pins 42 engage a wheel at the same level and at equal distances from the vertical diameter of the wheel, while the pin 43 is disposed to lie directly below the wheel in the vertical plane of the wheel axis. As best seen in Fig. 3, each pin 42 is made thin waisted, being formed with frusto conical portions 44 and with a cylindrical waist portion 45. Each waist portion 45 is substantially co-extensive in length with the thickness of a wheel so that the frusto conical surfaces tend to assist in centering and keeping a wheel centered lengthwise of the pin. Each pin 43 includes frusto conical portions 46 and an intervening waist portion 47. In this instance, however, the waist portion is of less diameter than the lesser diameters of the cone frusta so that the bottom marginal portion of a wheel is confined within certain limits between the vertical faces represented by lesser bases of the cones. The periphery of the wheel rests on the waist portions of the pins 42 but escapes engagement with the waist portion of the pin 43. The lower pin 43 acts as a guide to keep the wheel substantially vertically so that, with small variations in the staff position, the wheel will be free to contact both poising bars without binding in the circumferential recess of the pin 43.

Figure 43:
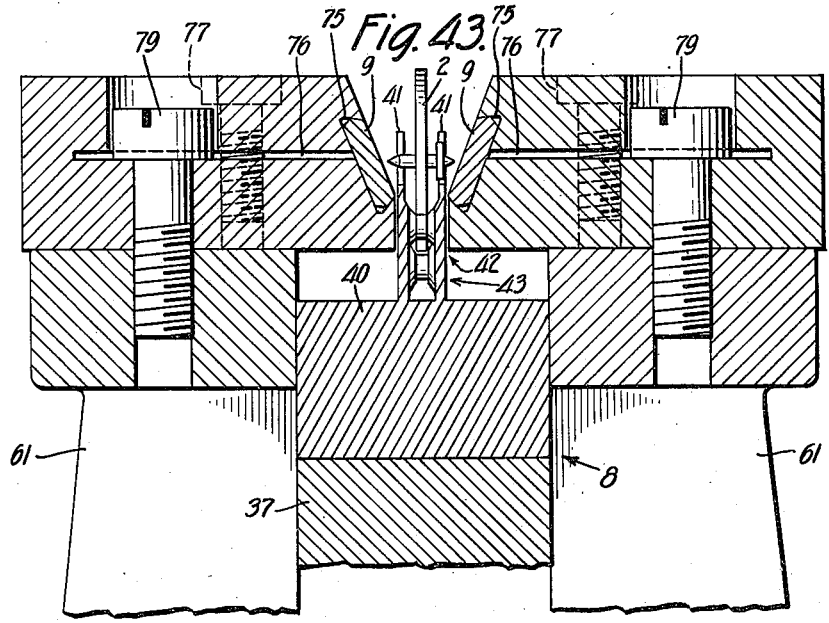
Fig. 43 is a transverse, vertical sectional view taken on the line 43—43 of Fig. 4 looking in the direction of the arrows, and showing the carriage in elevated position.

When the carriage is in the upper or broken line position, illustrated in Fig. 3, or in the position shown in Figs. 39 and 43, a wheel is supported by each set of pins 42, 43 in the manner just described. When the carriage has descended as far as the full line position of Fig. 3, however, the wheel is transferred to the poising bars 9 so that the carriage in its continued descent moves clear of the wheel, to the position in Figs. 37 and 44, and may then move backward to the position in Fig. 38 without disturbing the wheel on the poising bars 9. The webs 41 are provided with clearance slots 41a for the shafts 3 and discs 4 of the balance wheels 2.

The carriage is provided with horizontal wear plates 48 above and below the shaft 29, Figs. 9 and 12, and with similar plates 49 above and below the shaft 36, Fig. 11. Cams 50 and 51 are fast, respectively, upon the shafts 29 and 36 and cooperate, respectively, with the plates 48 and 49 for imparting the requisite vertical movements to the carriage. Vertical wear plates 52 are provided upon the carriage at opposite sides of the shaft 29, Figs. 4, 9 and 12, and cooperate with a cam 53 fast on the shaft 29 for imparting the requisite fore and aft movements to the carriage.

Pedestals 60, 61, 62, 63, 64, 65 and 66 are mounted in pairs upon the base 39 at opposite sides of the carriage and extend upward for supporting the clamping bars 10 and other stationary parts of the mechanism.

For the purpose of relieving the lifting cams of a portion of the load of the carriage, coil springs 67 and 68, Figs. 1, 9 and 11, are provided at opposite ends of the carriage. Two springs 67 are connected at their upper ends to lugs 69 formed on the pedestals 60, and at their lower ends to a pin 70 which extends through the carriage bar 37 and projects at opposite sides thereof. The springs extend downward into a well 71 formed in an end portion of the base 39. At the opposite end of the machine the two springs 68 are similarly connected to lugs 72 formed on the pedestal 66, extend down into a well 73 formed in the base 39, and are connected to a pin 74 which extends through the carriage bar and projects at opposite sides thereof. The spring mounting of the carriage greatly reduces the power consumption and the wear incident to the operation of the carriage, but it does not interfere with the four motion feeding of the carriage.

As has been mentioned, the poising bars 9 at each side of the machine are continuous and are supported by a series of clamping bars 10. The clamping bars at each side of the machine are spaced longitudinally from one another at the cutting stations to afford space for the cutting units to operate. Each clamping bar 10 is formed with a dovetail groove 75 Figs. 2, 3 and 43, in its face for receiving the poising bar and with a deep narrow groove 76 which extends outward for a substantial distance from the base of the dovetail groove. The upper and lower sections of a clamping bar are drawn firmly toward one another by screws 77, Figs. 4 and 43, which pass through the upper section of the clamping bar above the slot and are threaded into the lower section of the clamping bar below the slot 76. Each clamping bar is secured to the pedestal or pedestals upon which it is mounted by means of screws 79 (see particularly Figs. 43 and 44).

When the carriage has just completed an upward movement it is in the position illustrated in Figs. 1, 8 and 39. At that instant a wheel 2, released by the escapement mechanism, is caused to be deposited on the first set of pins 42—43 of the carriage. It will be observed from an examination of the wheel indicated in dot and dash lines at 2a in Fig. 39, that the wheel, while being thus delivered, passes between the webs 41 of the carriage and between the conical faces of the first pin 42 before the trailing portion of the wheel has passed from the lower guide channel formed by the block 15 and the bar 17 of the magazine 6. The notch 80 is provided in the upper receiving end of the carriage so as not to permit the wheel shaft 3 or the disc 4 to interfere with the rolling of a wheel down into position to be supported by the pins 42 and 43. The portion of the wheel, however, enters between the portions of the webs 41 at the forward side of the notch while still guided by the block 15 and the bar 17.

Figure 44:
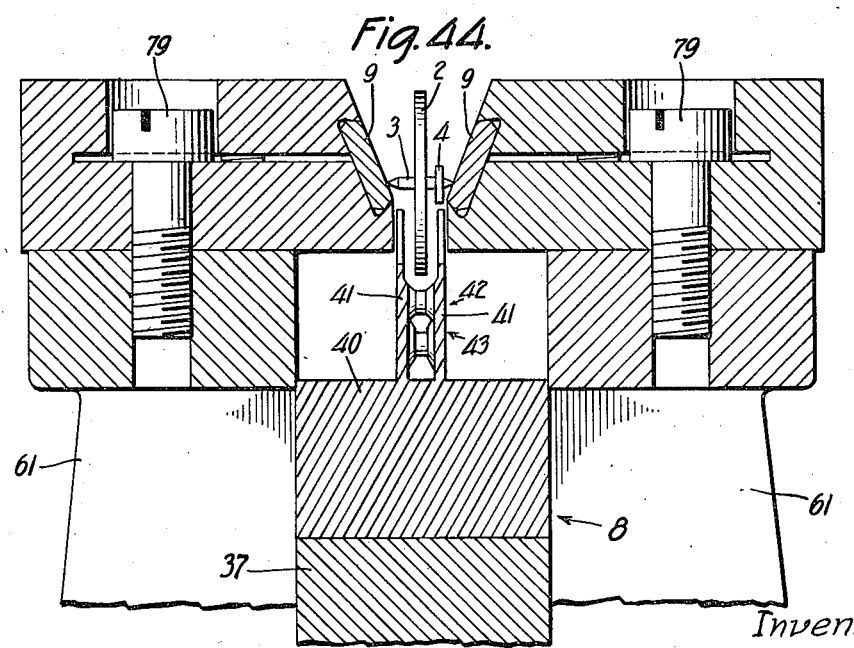
Fig. 44 is a view similar to Fig. 43 showing the carriage in lowered position and the balance wheel deposited on the poising bars.

The action of the carriage in advancing a wheel is well illustrated in Figs. 36 to 39. When a wheel has been received by the first set of pins 42, 43 in the full line position shown in Fig. 39, it is carried horizontally toward the right to the position illustrated in Fig. 36, the extent of this advance being exactly equal to the distance from the axis of one pin 43 to the next pin 43. The carriage then descends as illustrated in Figs. 37 and 44 to leave the wheels suspended on the poising bars 9. In its lower position, the carriage can move backward without disturbing the wheels on the poising bars. The carriage moves backward to the position of Fig. 38, in which position the next set of pins 42, 43 is brought underneath the wheel which was deposited on the poising bars by the previous set of pins. The carriage now moves upward to the position of Fig. 39 whereupon the entire cycle of operations is repeated. Each forward stroke of the carriage serves to advance every wheel an exact and uniform distance.

In the course of being advanced, the first wheel is repeatedly deposited on the poising bars so that it has an adequate opportunity to come to rest in a properly poised position, that is to say, so that the heavy side of the wheel is at the bottom. In this condition the wheel awaits the first cutting operation. At the first cutting station and at each subsequent cutting station the carriage is cut away (see for example Fig. 17), so that the webs 41 and the pins 42, 43 are omitted. Substitute means are provided, however, for supporting the balance wheels for cutting, as will be pointed out in the course of the description of a cutting unit.

Figure 28:
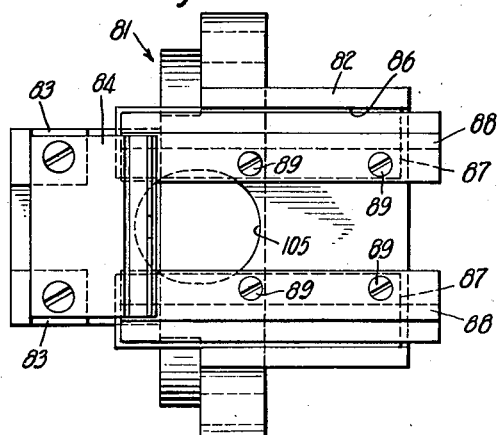
Fig. 28 is a plan view of a cutting unit supporting bracket.

The cutting units are all alike, save that two of them operate from the right hand side of the balance wheel path, Fig. 15, and two from the left hand side. A description of one of these units, therefore, will suffice for all of them. Taking, for example, the cutting unit 11b (see Figs. 5, 15, 23 and 26), this unit comprises a frame or bracket 81 which is bolted or otherwise suitably secured to a side of the carriage bar 37 in position to overlie one of the carriage cutouts. The bracket 81 includes a cross member 82 which terminates at its upper left hand end (see Figs. 20 and 23) in an upstanding U-shaped frame 83. A clamping block or vise jaw 84 is fixedly mounted in rabbets formed in the upper face of the arms of the U-shaped frame 83 and extends toward the right to terminate exactly in the plane in which it is desired to locate one face of a balance wheel during cutting. The clamping block 84 includes a pair of pins 85, Figs. 24 and 29, for supporting a balance wheel during cutting. These pins take the place of the omitted pins 42 as a means for lifting the wheel off the poising bars, for carrying it forward during the cutting operation, and for depositing it on the poising bars at the conclusion of that operation in position to be picked up at the next advancing step of the carriage by the next set of pins 42, 43. The pins 85 are desirably made to project a lesser distance than the thickness of a balance wheel so that they cannot, under any circumstances, interfere with the firm clamping of a balance wheel against the supporting face of the block 84. The horizontal portion 82 of the bracket 81 is formed in the upper face thereof with a channel 86. Superposed upon the base of the channel 86 are a shim 87, Figs. 22 and 28, and a dovetailed guide bar 88, the shim and guide bar being fixed to the bracket by any suitable means such as screws 89.

A slide 90, having a dovetail groove in its lower face is slidingly fitted upon the guide bar 88. The slide 90 in turn has a dovetail guide bar 91 affixed to its upper face by screws 92, and a secondary slide 93 having a dovetail groove in its lower face is slidingly mounted upon the guide bar 91. The slide 90, at its right hand end, has fixed upon it a downwardly extending plate 94, and a spacer block 95 is fixed to the lower end of the plate 94 at the right hand side thereof. A leaf spring 96 is disposed to have its lower end bear against the block 95, the spring being adjustably held against separation from the plate 94 by means of a headed screw 97 which is passed through the spring 96 and threaded into the plate 94. The upper end of the spring 96 bears against a plate 98 which is secured by screws 99 to the upper or secondary slide 93. The screws 99 engage in slots 96a, Fig. 21, of the spring 96 to keep the latter from turning about the screw 97. As will be pointed out presently means are provided for yieldingly operating the slide 90 toward the left, the result of leftward movement of the slide 90 being to transmit leftward movement yieldingly to the upper slide 93 through the spring 96. The leftward movement of the slide 93 is arrested by engagement of a clamping plate or vise jaw 100 (see Fig. 26) which is carried by pins 100a, Figs. 25 and 26, on the left hand end of the slide 93, and is adapted to bear against a face of the balance wheel 2. Thus, the balance wheel is caused to be firmly clamped between the jaws 84 and 100 in position for cutting, as in Fig. 30, while the slide 90, which carries a cutter 101, is still free to have its leftward movement continued. Such leftward movement is continued for exactly a predetermined distance to carry the cutter 101 toward the left, just far enough to make a cut of predetermined depth in the face of the balance wheel. The cutter 101 operates through a slot 101a formed in the jaw 100.

Figure 27:
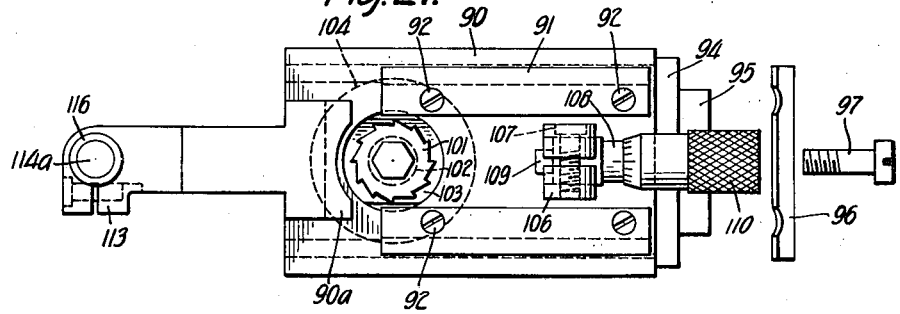
Fig. 27 is a plan view showing particularly the milling cutter and micrometer slide of a cutting unit.

The cutter 101 is secured, by a bolt 102a, upon a shaft 102, Figs. 23, 27 and 29, which is rotatively mounted in a sleeve 103 fixed to the slide 90, and carried by the slide. The shaft 102 is rotated by means of a pulley 104 fast on the lower end of the shaft 102. The sleeve 103 passes through an elongated opening 105 formed in the bracket member 83, the opening being made long enough to accommodate the relative movement of the sleeve and the bracket member 82 without interference.

The movement of the slide 90 toward the left in Fig. 23, is yieldingly effected in a manner which will be presently described. For the purpose of controlling the depth of the cut made by the cutter 101, provision is made of means for arresting leftward movement of the slide 90 at an exactly determined point. The slide 90 carries an upstanding micrometer clamp 106, which includes a split block having its separated portions drawn together by means of a clamping screw 107. The micrometer clamp clamps the barrel portion 108 of a micrometer. The micrometer may be of conventional construction and comprises a gauging or abutment member 109 which may be projected and retracted by rotation of a knurled knob 110. As shown, the micrometer includes suitable index means for indicating the setting to which it is adjusted.

The micrometer is located in a slot 111, Figs. 5, 23 and 26, formed in the right hand end of the slide 93, and has the operating face of the gauge member 109 disposed in juxtaposed relation to an abutment face 112 of the slide 93. When a balance wheel is first clamped, the cutter 101 is still out of engagement with the balance wheel as in Fig. 30 and the operating face of the gauge 109 is separated from the abutment face 112 of the slide 93 by exactly the amount which the slide 90 must move toward the left in order to effect a cut of the desired depth. The gauge member 109 and the abutment face 112 constitute stop or limiting means for absolutely controlling the leftward limit of movement of the slide 90, after the jaw 100 engages the face of the balance wheel, and hence the leftward limit of movement of the cutter 101. By properly adjusting the micrometer 110, this leftward limit of movement can be nicely regulated.

The sequence of events with relation to the clamping of the balance wheel and the movement of the cutter to its final cutting position is well illustrated in Figs. 29 to 31 inclusive. In Fig. 29, the balance wheel has been deposited between the jaws 84 and 100 and is about to be clamped, and the cutter 101 occupies its normal inactive relation to the slide 93. The slide 93 is normally pressed by the spring 96 against a fixed stop 90a on the slide 90, and consequently the cutter 101 and the slide 93 move in unison from the position of Fig. 29 to the position of Fig. 30, and then the slide 93 remains stationary while the slide 90 with cutter 101 continue its leftward movement to a position such as that illustrated in Fig. 31.

Provision is made of means for moving the slide 90 leftward in a yielding manner as an incident of the advance of the carriage, so that during a single advancing step of the carriage a balance wheel is clamped, a single cutting operation is fully performed, and the balance wheel is again unclamped in time to be deposited on the poising bars at the next descent of the carriage 8. The left hand end 113 of the slide 90 is formed as a split clamp to hold a supporting and bearing pin 114a. A cam follower roller 114, Fig. 23, is mounted on the pin 114a. This follower 114 includes a sleeve portion 115 and a cylindrical head 116. The head 116 coacts with a cam 117 formed in a cam bar 118, Figs. 5 and 15, which bar is jointly supported upon the pedestals 62 and 63 which are located on the left hand of the carriage bar 37 in Fig. 15. As illustrated especially in Figs. 5, 14 and 15, the cam bar 118 is pivotally mounted at one end on the pedestal 62 by means of a simple bolt 119 which forms a fixed pivot for the bar.

The pivot bolt 119 comprises a head 120 which overlies the bar, a cylindrical bearing body 121 which constitutes the pivot for the bar, flats 122 for engaging the walls of a slot 123 formed in the pedestal 62 to hold the bolt against rotation, and a threaded shank 124 which projects through the slot and beyond it. The pivot bolt is secured in place by means of a nut 125 which is threaded onto the shank 124 and against an under face of the pedestal 62 at opposite sides of the slot.

At the opposite end of the cam bar 118 a similar pivot bolt 126, Figs. 5 and 13, is provided and this pivot bolt is similarly mounted upon the pedestal 63. The cam bar, however, is formed with an elongated slot 127 to embrace the cylindrical bearing portion of the bolt 126 so that the forward end of the cam bar can shift to the right with relation to the bolt when required to do so. A coil spring 128, seated in a recess 129 of the pedestal 63, bears against the right hand face of the forward end of the cam bar 118 and maintains the right hand end of the slot 127 normally in engagement with the bearing surface of the pivot bolt 126.

Referring now to Figs. 5 and 16, it will be observed that the cam formation of the cam bar 118 comprises an upper portion for cooperating with the head 116 of the cam follower when the carriage is in its upper position and a lower portion for cooperating with the head of the cam follower 116 when the carriage is in its lower position. The head 116 is, of course, in cooperative engagement with the upper cam formation at the forward stroke of the carriage and with the lower portion at the return stroke of the carriage.

The upper cam formation is designed to act on the head 116 in such a manner as to draw the slide 90 toward the left. The upper cam portion is constructed to produce a sufficient leftward movement to cause a cut to be made of the maximum depth desired or even perhaps somewhat greater than the maximum depth likely to be desired. Leftward movement of the head 116 is, however, positively limited by the setting of the micrometer, and hence when the cut has reached the desired depth the head 116 will not be drawn farther to the left, but will compel the cam bar 118 to swing toward the right against the yielding resistance of the spring 128.

At the end of the forward or cutting stroke the head 116 is positively cammed toward the right, by a cam portion 117a, Fig. 5, thus removing the abnormal stress from the spring 128, and causing the slide 90 to be moved positively toward the right and to carry the cutter clear of the balance wheels. The abutment member 90a, fixed on the slide 90, is moved positively toward the right and in the course of such movement is caused to engage the jaw 100 and move the latter, together with its supporting slide 93, toward the right to an unclamping position. The clamping member 100 engages the abutment member 90a at all times when it is not actually clamped against a balance wheel. The spring 96 may, therefore, be maintained under any normal stress desired. The head 116 now descends with the carriage to occupy the lower dwell formation 117b on the return stroke of the carriage. This dwell formation, however, forms part of a straight groove which maintains the grinding unit parts in their final relative positions until the head is again raised, in the left hand portion of said slot, by the upward movement of the carriage and started forward.

The cutter operating pulley 104 is driven by a belt 130, Figs. 5, 7 and 7a, which extends toward the right in Fig. 7a and which is twisted through a right angle to be driven by a pulley 131 mounted upon a horizontal drive shaft 132. The horizontal drive shaft is supported in bearings 133 mounted upon a base member 134, the base member in turn being mounted, with the base 39, upon a table 135 of a main frame of the machine. All of the pulleys 104 are similarly driven from the common drive shaft 132. The drive shaft 132 has a driving pulley 136 fixed upon it, the pulley 136 being driven by a belt 137 from any suitable source of power.

The twist or turn of each drive belt 130 is utilized both for driving a vertical shaft from a horizontal shaft, and also for minimizing variations of tensions which the to and fro movement of the pulley 104 with the carriage tends to produce. In Fig. 7 the backward limit of the last pulley 104 is illustrated in full lines and the forward limit of movement of the same pulley is illustrated in dotted lines at 104a. It will be observed that the horizontal or pulling reach of the belt 130 crosses a vertical plane bisecting the corresponding pulley 131, so that the final positions of the two opposite positions of this reach of the belt are substantially symmetrical with relation to that plane. The slight variations of tension which occur can be readily accommodated by the natural resiliency of the belt material without substantial strain.

In Figs. 32 to 35 illustrative examples are given of the effect produced upon several balance wheels by passing them through the machine which has been described. It will be observed that in each instance four cuts 138, 139, 140 and 141 have been made. The cuts 138 and 139 are located in an outer annular cutting zone and in the right and left faces of the wheel, respectively, of Fig. 35. The cuts 140 and 141 are formed in a distinct inner annular cutting zone and in the left hand and right hand faces of the wheel, respectively. There is, therefore, no possibility of two of the cuts coinciding in part or in whole irrespective of whether the cuts are parallel or are angularly disposed with reference to each other.

It is for the purpose of assuring that a pair of cuts formed in the same face of the wheel shall be in different zones that the shims 87, (see Fig. 22) are employed. That is to say, a thick shim will raise the milling cutter relative to the center of the balance wheel in the cutting position of the latter, so that by a proper selection of shim thicknesses the location of the cutting in different zones can be readily assured, notwithstanding the fact that the cutting units are in general duplicates of one another.

As has been indicated, the first cut 138 takes away eight units, the second cut 139 takes away four units, the third cut 140 takes away two units, and the fourth cut 141 takes away one unit, the depth and length of the cuts being commensurate with the amount of material cut away.

Figure 32:
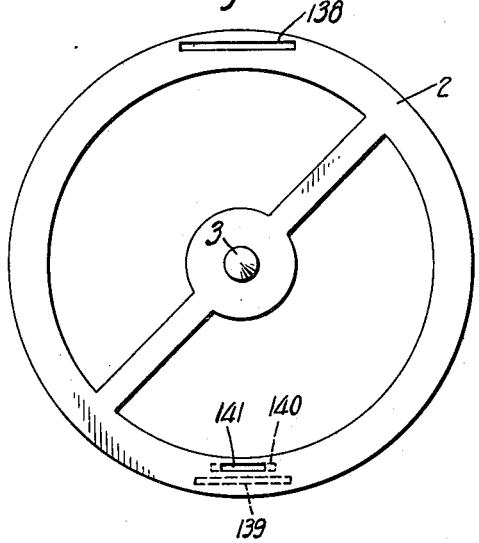
Fig. 32 illustrates a finished balance wheel which was originally perfect.

In Fig. 32, there is illustrated a wheel which went into the machine originally perfect. The first cut 138 removed eight units making the wheel eight units out of balance. The second cut 139 removed four units from a diametrically opposite point, making the wheel four units out of balance. The third cut 140 removed two units from the same sector of the wheel as the second cut, reducing the out of balance condition to two units, and the fourth cut 141 took off an additional unit, leaving the wheel one unit out of balance. In this particular instance, the wheel is actually impaired slightly by the cutting treatment, but the delivery of it within a prescribed limit of error is definitely assured. This occasional slight impairment is well repaid, however, by the general speed, efficiency and accuracy of the method in its effect upon the total output.

Figure 33:
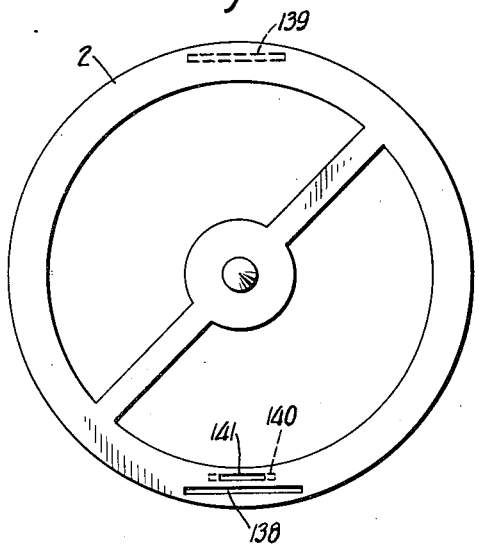
Fig. 33 illustrates a finished balance wheel which went into the machine seven units out of true.

In Fig. 33 a wheel is illustrated which was originally seven units off. The first cut 138 took off eight units, leaving the wheel one unit out of balance, the second cut 139 took off four units leaving the wheel three units out of balance, the third cut 140 took off two units leaving the wheel one unit out of balance, and the last cut 141 took off one unit leaving the wheel perfect.

Figure 34:
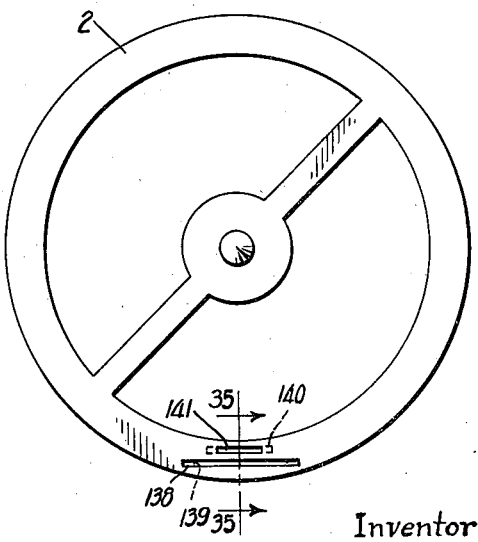
Fig. 34 shows a finished balance wheel which went into the machine sixteen units out of true.
Figure 35:
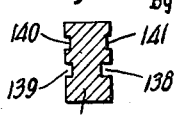
Fig. 35 is a fragmentary sectional view taken on the line 35—35 of Fig. 34 looking in the direction of the arrows.

In Fig. 34 a wheel is illustrated which went into the machine sixteen units out of balance. The first cut 138 took off eight units leaving the wheel eight units out of balance, the second cut 139 took off four units leaving the wheel four units out of balance, the third cut 140 took off two unit leaving the wheel two units out of balance, and the fourth cut 141 took off one unit leaving the wheel one unit out of balance.

The following table illustrates the effect of the cutting operations upon wheels which reach the machine in balance or any whole number of units out of balance from one to sixteen. It will be observed that any wheel which is originally exactly an even number of units out of balance not greater than sixteen or which is originally perfect, will leave the machine one unit out of balance. Any wheel which is originally an odd number of units out of balance from one to fifteen will leave the machine perfect.

| | Units removed | Original out of balance condition | | | | | | | | | | | | | | | | |
|---|---|---|---|---|---|---|---|---|---|---|---|---|---|---|---|---|---|---|
| | | 0 | 1 | 2 | 3 | 4 | 5 | 6 | 7 | 8 | 9 | 10 | 11 | 12 | 13 | 14 | 15 | 16 |
| First cut | 8 | 8 | 7 | 6 | 5 | 4 | 3 | 2 | 1 | 0 | 1 | 2 | 3 | 4 | 5 | 6 | 7 | 8 |
| Second cut | 4 | 4 | 3 | 2 | 1 | 0 | 1 | 2 | 3 | 4 | 3 | 2 | 1 | 0 | 1 | 2 | 3 | 4 |
| Third cut | 2 | 2 | 1 | 0 | 1 | 2 | 1 | 0 | 1 | 2 | 1 | 0 | 1 | 2 | 2 | 0 | 1 | 2 |
| Fourth cut | 1 | 1 | 0 | 1 | 0 | 1 | 0 | 1 | 0 | 1 | 0 | 1 | 0 | 1 | 0 | 1 | 0 | 1 |

Resulting out of balance conditions.

In actual practice, of course, the variations of the wheels will not generally be exactly whole numbers of units. Any wheel, however, which reaches the machine out of balance by an amount represented by a whole number of units not greater than fifteen, plus a fraction, will leave the machine less than one unit out of balance.

Ordinarily the cuts are all centered substantially upon a single diameter, as illustrated in Figs. 32 and 34. Occasionally they will be angularly related to one another, as shown in Fig. 2. This can only occur, however, when a wheel has been placed so nearly in balance by a cut as to render the location of the next cut immaterial. Such angular relation of the cuts does not, therefore, materially affect the result that no wheel will leave the machine more than a single unit out of balance. This is clear from the fact that after each cutting operation the possible remaining error is not materially greater than the amount of change produced by that operation.

It will be noted that in the described successive operations on the work pieces the amount of alteration of balance effected in each operation is predetermined irrespective of the unbalance actually existing in the work piece. However, the successive alterations of balance bear a relation to one another corresponding numerically to the terms of a geometrical series having in this instance a constant multiplier of 0.5. The method may be practiced where the multiplier for the series is less or greater than this, but the multiplier here used is adapted to effect the balancing with the minimum number of successive operations.

What is claimed is:

1. The method of balancing out of balance wheels which may vary up to a determined limit of error, which consists in alternately poising each wheel and cutting material from it, the first cut being regulated to cut from the lower side of the poised wheel an amount of material sufficient to remove a moment equal to one half of the determined limit, and each subsequent cut being regulated to cut from the repoised wheel an amount of material sufficient to remove one half as great a moment as was removed by the last preceding cut.

2. The method of balancing an out of balance wheel which comprises treating the wheel indiscriminately as if it may have been originally out of balance any amount up to a determined limit, such treatment comprising poising the wheel and then removing material to subtract from the heavy side of the wheel a moment equal to one half of the determined limit, whereby the assured limit of error is reduced one half, then repeating the poising and removing operations one or more times, subtracting from the heavy side at each operation, one half of the assured limit at the beginning of that operation.

3. The method of balancing an out of balance wheel, as set forth in claim 2, which comprises four material removing steps, the material being removed from two distinct annular zones in one face of the wheel, and from two distinct annular zones in the opposite face of the wheel.

4. The method of balancing out of balance wheels, as set forth in claim 2, which comprises four material removing steps, the first and fourth steps being performed, respectively, in outer and inner annular zones of one face of the wheel, and the second and third steps being performed, respectively, in outer and inner annular zones of the opposite face of the wheel.

5. In a machine for balancing out of balance wheels, in combination, a succession of wheel cutting devices, the first constructed and arranged to remove a predetermined amount of material for subtracting a moment of known value, and each subsequent device constructed and arranged to remove a predetermined amount of material for subtracting a moment one half as great as the moment subtracted by the preceding cutting device, means mechanically controlling the several cutting devices to compel their cutting effects to bear the above stated relation to one another, and means for delivering the wheels successively to said cutting devices, comprising means for advancing the wheels step by step to each cutting device, and means for poising the wheels in the intervals between advancing steps.

6. In a machine for balancing out of balance wheels, in combination, a succession of wheel cutting devices, and means for delivering the wheels successively to said cutting devices, comprising a carriage, means for moving the carriage cyclically in a closed path, poising bars to intercept the wheels as they move downwardly with the carriage, and to support them with freedom for rotation until the carriage has moved rearward and has again risen to the level at which the wheels were intercepted for lifting the wheels off the poising bars and carrying them forward.

7. In a machine for balancing out of balance wheels, in combination, a succession of wheel cutting devices, and means for delivering the wheels successively to said cutting devices, comprising a carriage having a to and fro movement, and a wheel poising means for lifting the wheels off the carriage at the end of each forward stroke and supporting them with freedom for rotation during the return stroke of the carriage.

8. A machine as set forth in claim 7, in which the cutting devices are mounted at intervals upon the carriage, and means are provided for causing the cutting devices to operate on the wheels during, and as an incident of the forward stroke of the carriage.

9. A machine as set forth in claim 7, in which means are provided for delivering the wheels to the carriage in timed relation to the movements of the latter, comprising a magazine, and an escapement mechanism for discharging the wheels singly and at uniform time intervals from the magazine.

10. A machine as set forth in claim 7, in which means are provided for delivering the wheels to the carriage in timed relation to the movements of the latter, comprising a magazine, and an escapement mechanism for discharging the wheels singly and at uniform time intervals from the magazine, and a receiving throat for feeding the magazine, constructed and arranged to set promiscuously deposited wheels on edge so that they may enter the magazine.

11. A machine as set forth in claim 7, in which means are provided for delivering the wheels to the carriage in timed relation to the movements of the latter, comprising a magazine, and an escapement mechanism for discharging the wheels singly and at uniform time intervals from the magazine, and a receiving throat for feeding the magazine, constructed and arranged to set promiscuously deposited wheels on edge so that they may enter the magazine, and a tray extending around the mouth of the receiving throat for holding a heterogeneously arranged supply of wheels, said tray communicating through its bottom with the receiving throat.

12. In a machine for operating upon balance wheels, each having a shaft which projects equally from opposite sides of the wheels, the combination with a tray for receiving heterogeneously arranged wheels, of a magazine for embracing the upper and lower peripheral portions of wheels to hold the wheels in upright attitudes, and an interposed V-shaped throat communicating with the tray through the bottom of the tray and having its sides equally inclined to cooperate with the ends of a balance wheel shaft to erect the wheel and guide the wheel in an upright attitude toward the magazine with the periphery of the wheel running in the base of the throat.

13. A magazine for supplying balance wheels, each having a shaft which projects beyond its opposite faces, said magazine comprising a recessed block, a pair of bars secured to said block in positions to extend, respectively, across the upper and lower portions of the recess to form upper and lower guide channels, said bars being spaced from one another to afford clearance for one end of the wheel shaft and access to the wheels, and said block having a channel formed in line with an intermediate portion of the recess to afford clearance for the other end of the wheel shaft.

14. In a machine for operating upon wheels, in combination, a carriage having a to and fro movement, a magazine supporting a series of wheels sequentially in upright attitudes, an escapement mechanism controlling the discharge of the wheels singly from the magazine, and means operating the escapement mechanism to release a single wheel each time the carriage is in wheel receiving position.

15. A machine as set forth in claim 14, in which the escapement mechanism comprises a rocking member and a pair of fingers extending transversely into the magazine from opposite sides thereof, the first in position to intercept the foremost wheel, and the other in position to intercept the next following wheel, the escapement mechanism being unbalanced in a direction to bias it by gravity toward a position to release the foremost wheel, and an escapement operating means including a cam for controlling and timing the escapement movements.

16. In a machine for operating upon wheels, in combination, a magazine, an escapement mechanism, a carriage, means for moving the carriage successively forward, down, back, and up, poising bars co-acting with the carriage and constructed and arranged to take over the support of the wheels as the carriage moves down, to hold the wheels without bodily movement as the carriage moves back, and to give up the wheels to the carriage for advance by the carriage as the carriage moves up, and means controlling operation of the escapement mechanism to cause a wheel to be delivered from the escapement mechanism to the carriage at the conclusion of each upward movement of the carriage.

17. In a machine for operating upon wheels having shafts projecting from opposite sides thereof, in combination, a magazine formed to provide upper and lower guide channels for embracing upper and lower marginal portions of a wheel, a carriage including upstanding spaced webs and wheel supporting pins extending between the webs, means for imparting to and fro movement to the carriage, and means for controlling the escapement mechanism to cause a wheel to be delivered from the magazine to the carriage while the carriage is so near the magazine that a wheel enters between the carriage webs before it has fully left the guide channels of the magazine.

18. In a machine for operating upon wheels having shafts projecting from opposite sides thereof, in combination, a magazine formed to provide upper and lower guide channels for embracing upper and lower marginal portions of a wheel, a carriage including upstanding spaced webs and wheel supporting pins extending between the webs, means for imparting to and fro movement to the carriage, and means for controlling the escapement mechanism to cause a wheel to be delivered from the magazine to the carriage while the carriage is so near the magazine that a wheel enters between the carriage webs before it has fully left the guide channels of the magazine, the carriage webs being notched at their receiving ends to afford clearance for the wheel shaft during transfer of the wheel from the magazine to the carriage.

19. In a machine for balancing out of balance wheels, in combination, a pair of spaced downwardly convergent poising bars, a carriage including a series of wheel supports, means for imparting four-motion feed to the carriage to cause the wheels to be advanced through uniform steps and regularly deposited at successive points along the poising bars, and a series of cutting devices carried at intervals by the carriage for cutting the wheels during certain of the advancing steps thereof.

20. In a machine for balancing out of balance wheels, in combination, means for advancing wheels step by step, means for poising the wheels between successive advancing steps, and means for automatically clamping and cutting the wheels during certain of the advancing steps thereof.

21. In a machine for balancing out of balance wheels, in combination, a plurality of cutting devices located at different cutting stations, means for advancing wheels to the first station and for transferring them from the first station to the second, and means for poising each wheel while the wheel is en route to each cutting station.

22. In a machine for balancing out of balance wheels, in combination, a carriage, comprising a succession of pairs of upstanding laterally spaced wheel embracing webs and sets of wheel supporting pins extending between opposed pairs of webs and arranged at uniform intervals along the webs, a succession of cutting devices each mounted on the carriage and each disposed between two successive pairs of webs, each cutting device including relatively stationary and movable wheel clamping jaws, and wheel supporting pins carried exclusively by the relatively stationary jaw for supporting the wheels during cutting.

23. In a machine for balancing out of balance wheels, in combination, a carriage, means for moving the carriage to and fro, means cooperative with the carriage to cause the wheels to advance as the carriage advances, but to remain stationary as the carriage returns so that the wheels are advanced step by step, and a cutting device carried by the carriage and comprising relatively stationary and movable clamping jaws, a cutting wheel, and means for operating the movable jaw to clamp the wheels to be cut, and for moving the cutting wheel to make a cut of predetermined depth.

24. In a machine for balancing out of balance wheels, in combination, a carriage, means for moving the carriage to and fro, means cooperative with the carriage to cause the wheels to advance as the carriage advances, but to remain stationary as the carriage returns so that the wheels are advanced step by step, and a cutting device carried by the carriage and comprising relatively stationary and movable clamping jaws, a cutting wheel, and means for operating the movable jaw to clamp the wheels to be cut, and for moving the cutting wheel to make a cut of predetermined depth, said operating means comprising a transversely movable member, means supporting the cutting wheel upon said member for rotation about an axis fixed with relation to said member, and means for supporting the movable clamping jaw upon said member and for yieldingly urging it to move with said member.

25. In a machine for balancing out of balance wheels, in combination, a carriage, means for advancing the carriage, and a cutting device mounted on the carriage and comprising relatively stationary and movable clamping jaws, a cutting wheel, a transversely movable member, means supporting the cutting wheel upon said member for rotation about an axis fixed with relation to said member, means for supporting the movable clamping jaw upon said member and for yieldingly urging it to move with said member, the arrangement being such that the movable clamping jaw may be arrested by engagement with the wheel to be cut, while the movement of the cutting wheel is continued, and means for positively limiting the continued movement of the cutting wheel.

26. In a machine for balancing out of balance wheels, in combination, a carriage, means for advancing the carriage, and a cutting device mounted on the carriage and comprising relatively stationary and movable clamping jaws, a cutting wheel, a transversely movable member, means supporting the cutting wheel upon said member for rotation about an axis fixed with relation to said member, means for supporting the movable clamping jaw upon said member and for yieldingly urging it to move with said member, the arrangement being such that the movable clamping jaw may be arrested by engagement with the wheel to be cut while the movement of the cutting wheel is continued, and means for positively limiting the continued movement of the cutting wheel, comprising a micrometer mounted on the transversely movable member and engageable with the movable jaw supporting means.

27. In a machine for balancing out of balance wheels, in combination, a carriage, means for advancing the carriage, and a cutting device mounted on the carriage and comprising relatively stationary and movable clamping jaws, a cutting element, a transversely movable member, means supporting the cutting element upon said member for rotation about an axis fixed with relation to said member, means for supporting the movable clamping jaw upon said member and for yieldingly urging it to move with said member, the arrangement being such that the movable clamping jaw may be arrested by engagement with the wheel to be cut while the movement of the cutting element is continued, and means for positively limiting the continued movement of the cutting element, and means for yieldingly operating the transversely movable member in a direction to carry the cutting element toward the wheel to be cut.

28. In a machine for balancing out of balance wheels, in combination, a carriage, means for advancing the carriage, and a cutting device mounted on the carriage and comprising relatively stationary and movable clamping jaws, a cutting wheel, a transversely movable member, means supporting the cutting wheel upon said member for rotation about an axis fixed with relation to said member, means for supporting the movable clamping jaw upon said member and for yieldingly urging it to move with said member, the arrangement being such that the movable clamping jaw may be arrested by engagement with the wheel to be cut while the movement of the cutting wheel is continued, means for positively limiting the continued movement of the cutting wheel, and means for yieldingly operating the transversely movable member in a direction to carry the cutting wheel toward the wheel to be cut, comprising a cam follower fixed to the transversely movable member, a cam cooperative therewith, and means yieldingly supporting the cam against movement.

29. In a machine for balancing out of balance wheels, in combination, a carriage, means for advancing the carriage, and a cutting device mounted on the carriage and comprising relatively stationary and movable clamping jaws, a cutting wheel, a transversely movable member, means supporting the cutting wheel upon said member for rotation about an axis fixed with relation to said member, means for supporting the movable clamping jaw upon said member and for yieldingly urging it to move with said member, the arrangement being such that the movable clamping jaw may be arrested by engagement with the wheel to be cut while the movement of the cutting wheel is continued, and means for positively limiting the continued movement of the cutting wheel, and means for yieldingly operating the transversely movable member in a direction to carry the cutting wheel toward the wheel to be cut, comprising a cam followed fixed to the transversely movable member, a pivoted cam cooperative therewith, and a spring normally holding the cam stationary.

30. In a machine for balancing out of balance wheels, in combination, a carriage, means for advancing the carriage, and a cutting device mounted on the carriage and comprising relatively stationary and movable clamping jaws, a cutting wheel, a transversely movable member, means supporting the cutting wheel upon said member for rotation about an axis fixed with relation to said member, means for supporting the movable clamping jaw upon said member and for yieldingly urging it to move with said member, the arrangement being such that the movable clamping jaw may be arrested by engagement with the wheel to be cut while the movement of the cutting wheel is continued, and means for positively limiting the continued movement of the cutting wheel, and means for yieldingly operating the transversely movable member in a direction to carry the cutting wheel toward the wheel to be cut comprising a cam follower fixed to the transversely movable member, and participating with the latter in the movements of the carriage, and a cam cooperative with said follower and formed to move the follower first in the direction to effect clamping and cutting, and then in the opposite direction as an incident of an advancing movement of the carriage.

31. In a machine for balancing out of balance wheels, in combination, a carriage, means for moving the carriage, forward, down, back, and up in succession, a cutting device mounted on the carriage comprising relatively fixed and movable clamping jaws and a cutting wheel, a transversely movable member for clamping the wheel to be cut, for moving the cutting wheel to make a cut of predetermined depth, and for unclamping the cut wheel, a cam follower fixed on said member and having a head portion and a reduced shank portion, and a cam for acting upon the follower comprising an upper track cooperative with the follower head during the forward stroke of the carriage, and a lower track cooperative with the follower head during the return stroke of the carriage, said tracks registering at their ends to enable the follower head to be shifted from one to the other of said tracks as the carriage moves up and down.

32. In a machine for balancing out of balance wheels, in combination, a carriage, means for moving the carriage, forward, down, back, and up in succession, a cutting device mounted on the carriage comprising relatively fixed and movable clamping jaws and a cutting wheel, a transversely movable member for clamping the wheel to be cut, for moving the cutting wheel to make a cut of predetermined depth, and for unclamping the cut wheel, a cam follower fixed on said member and having a head portion and a reduced shank portion, and a cam for acting upon the follower comprising an upper track cooperative with the follower head during the forward stroke of the carriage, and a lower track cooperative with the follower head during the return stroke of the carriage, said tracks registering at their ends to enable the follower head to be shifted from one to the other of said tracks as the carriage moves up and down, means supporting the cam at one end for pivotal movement in a horizontal plane, and means including a fixed abutment and a spring for yieldingly maintaining the opposite end of the cam in a fixed normal position with capacity for yielding when the cutting wheel has made a cut of predetermined depth.

33. In a machine for cutting wheels, in combination, a carriage, means for moving the carriage to and fro, a vertical shaft mounted on the carriage and movable therewith, a cutting wheel mounted on the shaft, an operating pulley also mounted on the shaft, a horizontal drive shaft mounted independently of the carriage and extending longitudinally thereof, a driving pulley fixed on and rotated by said drive shaft, and a driving belt connecting the pulleys, said belt being twisted through a right angle in passing from one pulley to the other.

34. In a machine for cutting wheels, in combination, a carriage, means for moving the carriage to and fro, a vertical shaft mounted on the carriage and movable therewith, a cutting wheel mounted on the shaft, an operating pulley also mounted on the shaft, a horizontal drive shaft mounted independently of the carriage and extending longitudinally thereof, a driving pulley fixed on and rotated by said drive shaft, and a driving belt connecting the pulleys, said belt being twisted through a right angle in passing from one pulley to the other, the arrangement being such that the pulling stretch of the belt crosses the median vertical plane of the driving pulley between extreme positions which are substantially symmetrical with relation to such plane as the operating pulley is shifted to and fro by the carriage.

35. In a machine for cutting wheels, in combination, a carriage, means for moving the carriage forward, down, back and up in succession, a vertical shaft mounted on the carriage and movable therewith, a cutting wheel and an operating pulley fixed on said shaft, means for moving the vertical shaft crosswise of the carriage, a horizontal drive shaft mounted independently of the carriage and extending longitudinally thereof, the distance of the horizontal shaft from the operating pulley being great as compared with the bodily movements of the pulley, a driving pulley fixed on the driving shaft, and a driving belt connecting the pulleys, said belt being twisted through a right angle in passing from one pulley to the other.

36. In a machine for reducing unbalance about the intended axis of rotation of a work piece, the combination of means for supporting work pieces in a plurality of spaced positions, means for transfer of the work pieces from one of said spaced positions to another thereof, means associated with one of said positions for establishing the angular position of a work piece relative to said supporting means in accordance with the angular position of unbalance in the work piece, unbalance reducing means operatively associated with said supporting means and angular position establishing means to effect a reduction of unbalance in a work piece at an angular position therein determined by said angular position establishing means, and means timing the operation of said unbalance reducing means relative to the operation of said transfer means.

37. In a machine for reducing unbalance about the intended axis of rotation of a work piece, the combination of a plurality of supporting means respectively for supporting work pieces in different spaced positions, a device for transfer of a plurality of work pieces one after another in a step-by-step progress through a plurality of said spaced positions, a device for individually determining the angular position of unbalance about the axis of each work piece progressed by said transfer means, an unbalance changing device operable on each work piece progressed by said transfer device at an angular position individually determined for the work piece by said angular position determining device, means operatively associated with said changing device and determinative of the amount of unbalance change effected thereby, and means interconnecting said devices for timing the operation of each device relative to the time of operation of the other devices.

38. In a machine for reducing unbalance about the intended axis of rotation of a work piece, the combination of means for supporting a plurality of work pieces respectively in different spaced positions, means for transfer of a plurality of work pieces one after another in a step-by-step progress through a plurality of said spaced positions, means for individually determining the angular position of unbalance about the axis of each work piece progressed by said transfer means, unbalance reducing means operable on each work piece progressed by said transfer means at an angular position individually determined for the work piece by said angular position determining means, and timing means determinative of the relative time of operation of said transfer means, of said angular position determining means and of said unbalance reducing means.

39. In a machine for balancing out of balance work pieces, in combination, means for advancing a work piece step by step, means operative between successive steps of the advance for angularly positioning the work piece in accordance with the angle of an unbalance about the work axis, and means for automatically clamping the work piece and reducing the unbalance thereof in timed relation to the advancing steps thereof.

40. In a machine for balancing out of balance work pieces, in combination, a carriage, means for moving the carriage to and fro, means cooperative with the carriage to cause the work pieces to advance as the carriage advances, but to remain stationary as the carriage returns so that the work pieces are advanced step by step, means for angularly positioning the work piece in accordance with the unbalance thereof, and unbalance reducing means including relatively movable clamping jaws, an unbalance reducing device, and means for operating said jaws to clamp the work pieces in an angular position relative to said reducing device determined by said angular positioning means.

41. The method of balancing out of balance work pieces which may vary up to a determined initial limit of unbalance moment, which consists in alternately angularly positioning each work piece according to the angular position of its unbalance, and altering the balance thereof at a point determined by such positioning and in a predetermined amount, the first alteration being of an amount substantially equal to one-half the initial limit of unbalance moment, and subsequent alterations being of an amount substantially equal to one-half the moment of the immediately preceding alteration.

42. The method of balancing an out of balance work piece which comprises treating the work piece as if it may have originally been out of balance any amount up to a determined initial limit of unbalance moment, such treatment comprising angularly positioning the work piece according to the angular position of its unbalance and then altering its unbalance at a point determined by such positioning in an amount substantially equal to one-half the initial limit of unbalance, whereby the assured limit of the remaining unbalance is reduced to substantially one-half the initial limit, and then repeating the positioning and altering operation one or more times, the alteration at each operation being substantially one-half the moment of the assured limit at the beginning of that operation.

43. In a machine for reducing unbalance about the intended rotation axis of each of a series of work pieces one after another, the combination of a first device for individually establishing the angle of an unbalance moment about said intended axis of the work pieces, a second device for individual unbalance alteration of the work pieces at an angle in accordance with the angle established by said first device; said devices being adapted for the work pieces to be transferred from a position operatively associated with said first device to a position operatively associated with said second device, and means interconnecting said devices to initiate the unbalance alteration effected by said second device in predetermined timed relationship to initiation of the angle establishing operation effected by said first device.

44. The method of balancing a work part to effect a predetermined maximum limit of final unbalance which comprises treating the part as if it were out of balance an assumed initial unbalance moment irrespective of its actual initial unbalance, such treatment comprising a step which includes determining the position of the actual unbalance for determining the position of an alteration and effecting the alteration at the position so determined as a predetermined fraction of the assumed initial unbalance and irrespective of the actual unbalance, and then performing one or more additional steps in the same manner but with the alteration of each additional step in an amount forming a predetermined fraction of the alteration of the immediately preceding step.

45. In a machine for balancing a work piece to effect a predetermined maximum limit of unbalance about an intended axis of rotation thereof, the combination of a plurality of devices arranged in sequential order to successively receive the work piece, each of said devices including unbalance altering mechanism and means for angularly positioning said work piece relative to said mechanism in accordance with the angular position about said axis of an unbalance in the work piece, the altering mechanism of the first device in said sequential order being operative to alter the unbalance in a predetermined amount irrespective of the actual unbalance initially present in the work piece, and the altering mechanism of each succeeding device being operative to alter the unbalance by a predetermined fractional part of the immediately preceding alteration.

46. A balancing machine as recited in claim 45 including means interconnecting the unbalance altering mechanisms of said devices for timing the operation of each mechanism relative to the time of operation of the other mechanisms.

47. In a machine for reducing unbalance about the intended rotation axis of each of a series of work pieces one after another, the combination of a first device for individually establishing the angle of an unbalance moment about said intended axis of the work pieces, a second device including mechanism for individual unbalance alteration of the work pieces, said devices being spaced apart for the work pieces to be transferred from a first bodily position associated with said first device to a second bodily position relative to said alteration mechanism, and an angle establishing interconnection between said devices to effect said second position of the work pieces in automatic accordance with an angle of unbalance established by said first device, whereby the unbalance alteration effected by said second device is at an angle about the axis of each transferred work piece established for the same work piece by said first device.

WILLIAM BARTON EDDISON.
MARION H. McADAM,
DENNIS THEODORE KELLY,
DIXON B. GRISWOLD,
Executors of the Estate of John V. McAdam, Deceased.